US007769245B2

(12) United States Patent
Maeda et al.

(10) Patent No.: US 7,769,245 B2
(45) Date of Patent: Aug. 3, 2010

(54) IMAGE COMBINING APPARATUS AND CONTROL METHOD FOR THE SAME

(75) Inventors: Masao Maeda, Kawasaki (JP); Seiya Fujinaga, Kawasaki (JP); Yoshiyuki Hirai, Kunitachi (JP); Nobuyuki Bannai, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 956 days.

(21) Appl. No.: 11/533,727

(22) Filed: Sep. 20, 2006

(65) Prior Publication Data

US 2007/0076980 A1 Apr. 5, 2007

(30) Foreign Application Priority Data

Sep. 30, 2005 (JP) ............................ 2005-286294
Sep. 30, 2005 (JP) ............................ 2005-289037
Jul. 25, 2006 (JP) ............................ 2006-202617

(51) Int. Cl.
*G06K 9/36* (2006.01)

(52) U.S. Cl. ...................................... 382/284; 382/309

(58) Field of Classification Search ................ 382/232, 382/202, 101, 203, 116, 284, 309; 345/634, 345/157; 358/451, 492, 494, 296, 1.9; 229/300, 229/301; 250/208.1, 569; 235/462.1, 491, 235/386; 707/E17.023; 347/12, 19
See application file for complete search history.

(56) References Cited

U.S. PATENT DOCUMENTS 5,199,081 A * 3/1993 Saito et al. .................. 382/116
6,421,042 B1 * 7/2002 Omura et al. ............... 345/157
6,764,155 B2 * 7/2004 D'Souza et al. ............... 347/12

FOREIGN PATENT DOCUMENTS

JP 09-139832 5/1997
JP 63-040933 9/2006

* cited by examiner

*Primary Examiner*—Anh Ohng Do
(74) *Attorney, Agent, or Firm*—Canon USA Inc IP Div

(57) ABSTRACT

An image combining apparatus and a control method for an image combining apparatus that allows a user to write a handwritten image on a writing sheet while confirming the positional relationship between the handwritten image and a photograph to be combined. When a writing sheet having a handwriting area in which a user writes the handwritten image to be combined with a photograph is printed, a reference image generated on the basis of the photograph is printed in the handwriting area.

8 Claims, 31 Drawing Sheets

FIG. 22
2005 TRIP TO ITALY
MILAN/VENICE/FLORENCE/ROME

IMAGE COMBINING APPARATUS AND CONTROL METHOD FOR THE SAME

BACKGROUND OF THE INVENTION

1. Field of the Invention

The present invention relates to image combining apparatuses and control methods for the same. More particularly, though not exclusively, the present invention relates to an image combining apparatus and a control method for the same that load a photograph, scan an original document, print an image on a printing sheet, and combine image data of the loaded photograph and image data of the scanned original document.

2. Description of the Related Art

With the recent widespread use and enhanced performance of image input devices, such as digital cameras and color scanners, and image output devices, such as color printers, various usages of digital photographs have been suggested.

In addition to simply shooting photographs and printing the photographs on printing sheets, the photographs are often used after performing various processing and editing operations. For example, a user mails the photographs after writing messages thereon, or puts the photographs in an album after adding titles and illustrations thereto.

As mentioned above, some methods of adding handwritten images and illustrations to photographs loaded from image input devices have been suggested.

For example, Japanese Patent Laid-Open No. 63-040933 discloses a method of combining a photograph and a handwritten image. More specifically, in this method, a loaded photograph is displayed on a display device such as a liquid crystal panel. A user then writes the handwritten image using a touch panel input device that is disposed on the display device. Accordingly, the photograph and the handwritten image are combined.

In addition, Japanese Patent Laid-Open No. 09-139832 discloses another method of combining a photograph and a handwritten image. In this method, a scanner scans a handwritten image written on a sheet other than a sheet having a loaded photograph printed thereon. Then, the photograph and the scanned handwritten image are combined.

However, the known methods have the following disadvantages when selectively writing handwritten images and drawing illustrations in a background part, not containing a subject such as people, of a photograph.

Methods employing a touch panel input device allow a user to directly write handwritten characters and draw illustrations over the photograph while viewing the photograph. Nevertheless, these methods require a display device and a touch panel input device, which leads to an increase in hardware cost.

In addition, the resolution of the handwritten image depends on the resolution of the display device or the touch panel input device, which undesirably limits detailed expression of the handwritten image.

On the other hand, methods of scanning a handwritten image allow a user to quickly and easily write the handwritten image. Additionally, the methods allow the user to create various types of messages using various kinds of writing tools. However, these methods use a handwriting sheet different from a sheet having the photograph printed thereon, thus preventing the user from confirming the positional relationship between the photograph and the handwritten image to be superimposed on the photograph when generating the handwritten image.

Additionally, the photograph may be printed as a background image in a handwriting area of a handwriting sheet in a light color (i.e., a dropout color) using dye ink. In such a case, depending on the kinds of writing tool, such as a pen, to be used to write the handwritten image, ink of the writing tool may mix with the dye ink of the background image, which causes a blur on the handwriting sheet. As a result, the scanned color may differ from the color that the user has intended, or the combined image may include the printed background image. Moreover, not only the kinds of writing tool used such as a pen but also the kinds of printing medium used cause a similar disadvantage.

SUMMARY OF THE INVENTION

The present invention is directed to an image combining apparatus and a control method for the same which allow a user to write a handwritten image on a sheet while confirming the positional relationship between a photograph and the handwritten image to be combined. In addition, the image combining apparatus and the control method for the same can reduce effects of a reference image on the handwritten image without losing recognizability of the positional relationship between the reference image and the handwritten image.

According to an aspect of the present invention, an image combining apparatus for printing a writing sheet having a handwriting area in which a user writes a handwritten image to be combined with a photograph, the image combining apparatus includes a generating unit configured to generate a reference image from the photograph; and a printing unit configured to print the reference image generated by the generating unit in the handwriting area.

According to another aspect, a control method for an image combining apparatus for printing a writing sheet having a handwriting area in which a user writes a handwritten image to be combined with a photograph includes generating a reference image from the photograph; and printing the reference image generated in the step of generating the reference image in the handwriting area.

Further features of the present invention will become apparent from the following description of exemplary embodiments with reference to the attached drawings.

DESCRIPTION OF THE EMBODIMENTS

Exemplary Embodiment 1

Figure 1:
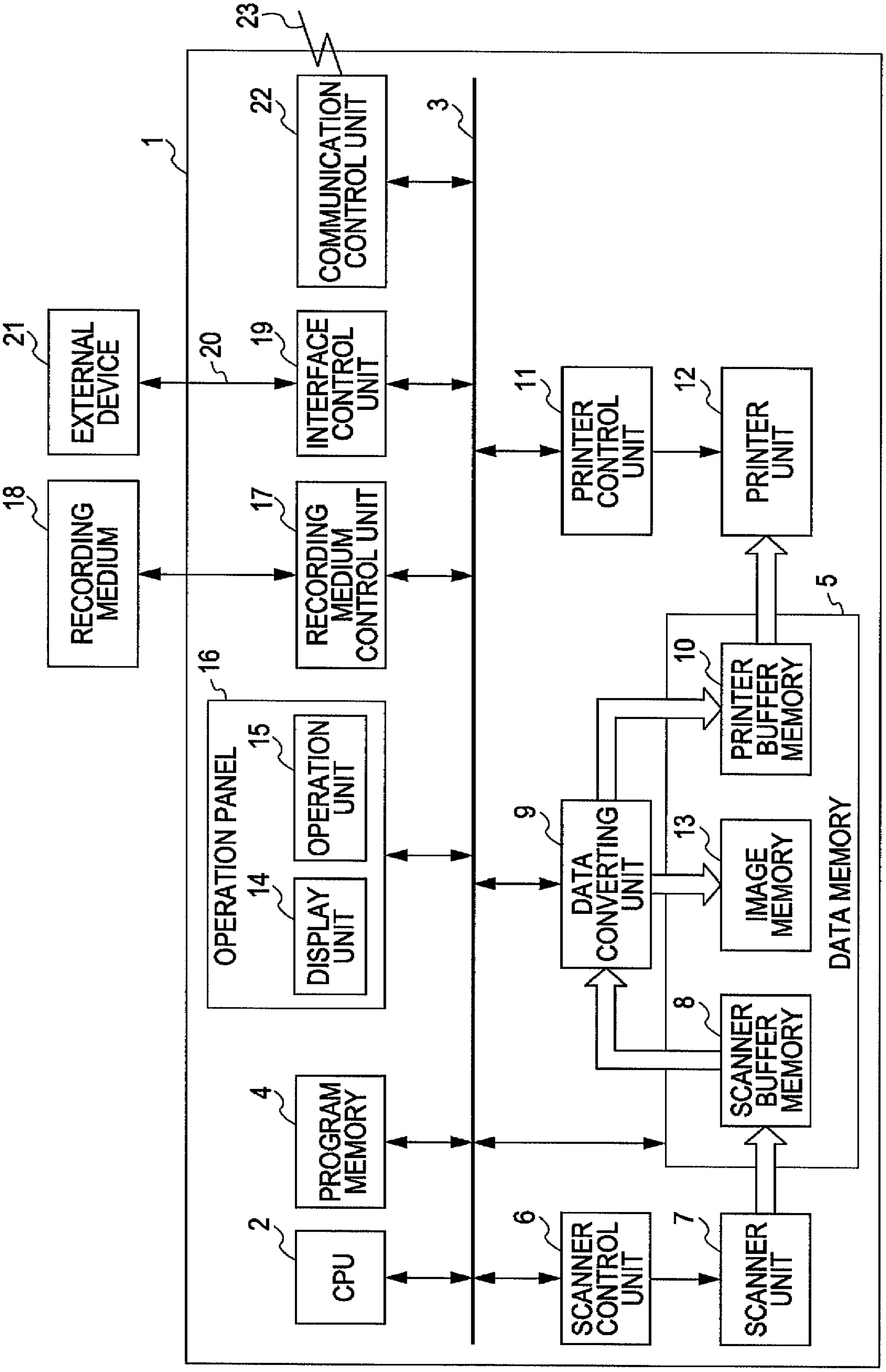
FIG. 1 is a block diagram showing an exemplary configuration of an image combining apparatus according to an exemplary embodiment 1 of the present invention.

FIG. 1 is a block diagram showing an exemplary configuration of an image combining apparatus 1 according to an exemplary embodiment of the present invention.

The image combining apparatus 1 includes a CPU (Central Processing Unit) 2, which may be, for example, a microprocessor. The CPU 2 is connected to a program memory 4 such as a ROM (Read-Only Memory) and a data memory 5 such as a RAM (Random-Access Memory) via an internal bus 3. The CPU 2 works according to control programs stored in the program memory 4 and data stored in the data memory 5.

The CPU 2 controls operations of a scanner unit 7 via a scanner control unit 6. Image sensors (not shown) included in the scanner unit 7 scan original images. The scanned original image data is then stored in a scanner buffer memory 8 included in the data memory 5.

A data converting unit 9 reads out the original image data stored in the scanner buffer memory 8, and converts the original image data into print data, which is then stored in a printer buffer memory 10 included in the data memory 5. While controlling a printer unit 12 via a printer control unit 11, the CPU 2 also feeds the print data to the printer unit 12 after reading out the data from the printer buffer memory 10, such that the printer unit 12 prints the data onto a printing medium. Accordingly, the image combining apparatus 1 implements a copying operation.

The data memory 5 also includes an image memory 13. The image memory 13 temporarily stores the original image data scanned by the scanner unit 7 and various image data so as to enable editing of the images. The data converting unit 9 reads out the image data stored in the image memory 13, and converts the image data into the print data. The printer unit 12 then performs a printing operation. Accordingly, in addition to the copying operation, the image combining apparatus 1 is capable of performing a printing operation of photographs and other documents.

The CPU 2 manages the data memory 5 such that the scanner buffer memory 8, printer buffer memory 10, and image memory 13 of the data memory 5 are dynamically distributed and allocated in accordance with operation environments such as operation modes and user settings. In addition, the data converting unit 9 performs image processing such as image analysis, thumbnail generation, thumbnail correction, and output image correction.

The image combining apparatus 1 also includes an operation panel 16. The operation panel 16 further includes a display unit 14, such as LEDs (Light-emitting Diodes) and an LCD (Liquid Crystal Display), and an operation unit 15, such as a keyboard. Accordingly, the image combining apparatus 1 allows an operator to perform various input operations and displays the operation environments to the operator.

A recording medium control unit 17 performs access control of a data recording medium (hereinafter, simply referred to as "recording medium") 18 such as a memory card, and writes and reads image data or other data to and from the recording medium 18. For example, the photograph data stored in the recording medium 18 is read out, stored in the image memory 13, converted into print data, and then printed.

An interface control unit 19 controls communication via an interface 20, and sends and receives data to and from an external device 21 externally connected to the image combining apparatus 1 via the interface 20. When connected to the external device 21, e.g., a personal computer, the image combining apparatus 1 receives print data generated by a printer driver that is compatible with the computer, and prints the received data. In addition, when connected to an image capturing apparatus such as a digital camera, the image combining apparatus 1 reads out photograph data, stores the read-out data in the image memory 13, and prints the print data after converting the read-out data into the print data.

A communication control unit 22 includes a MODEM (Modulator-Demodulator) and an NCU (Network Control Unit). The communication control unit 22, which is connected to an analog communication line 23, performs communication control and line control such as control of call-in and call-out to and from the communication line 23.

Figure 2:
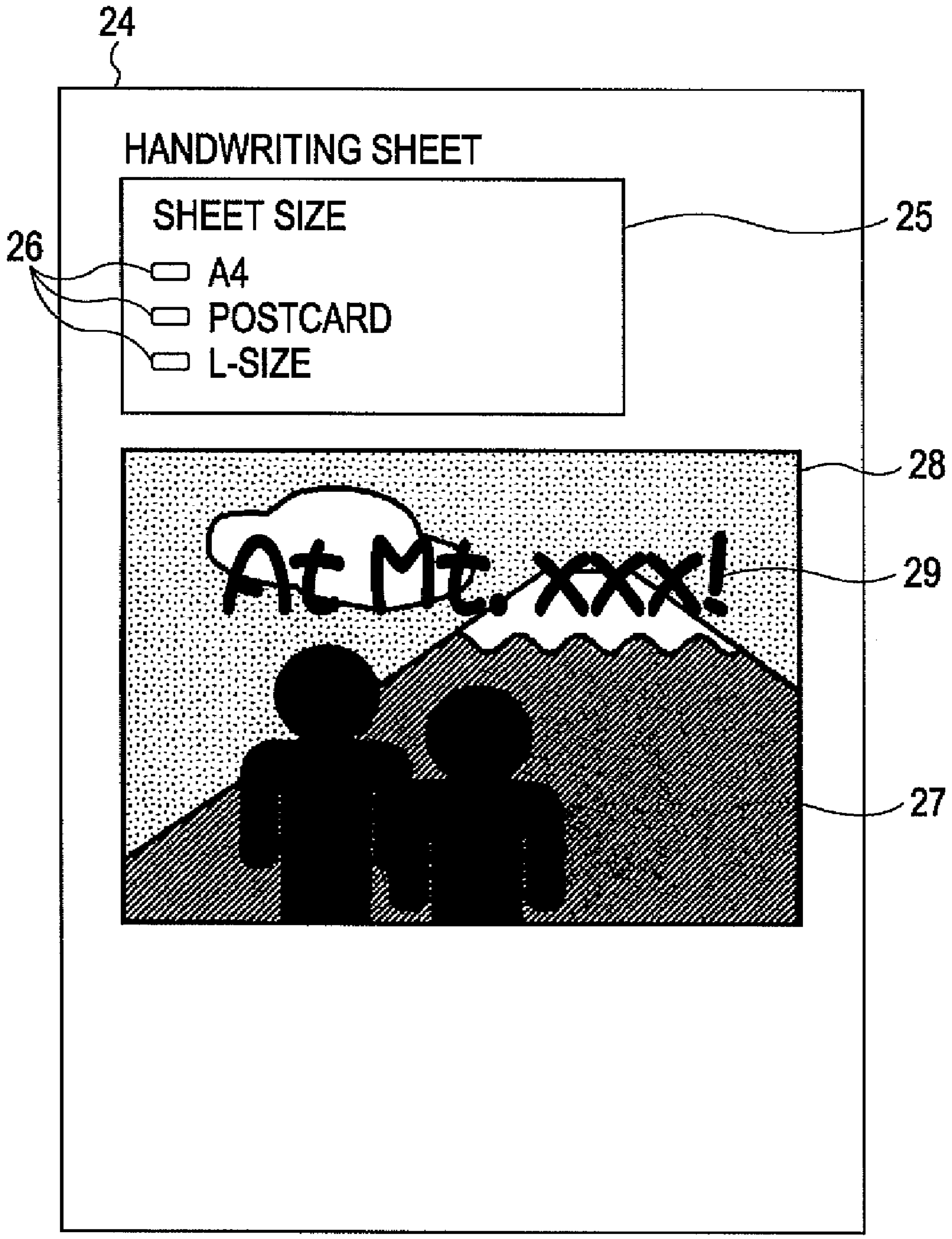
FIG. 2 shows an exemplary configuration of a handwriting sheet employed in an exemplary embodiment 1 of the present invention.

FIG. 2 shows an exemplary configuration of a handwriting sheet 24 applicable to the exemplary embodiment 1.

A setting area 25 is disposed at the top of the handwriting sheet 24. A user can select settings relating to printing of a combined result by marking frames disposed in the setting area 25.

In FIG. 2, for example, medium size selection frames 26 are disposed within the setting area 25. The user can select the size of a printing medium onto which the combined result is printed by marking one of the medium size selection frames 26.

In the handwriting sheet 24, a handwriting area 28 is disposed below the setting area 25. The user can write a handwritten image 29 in the handwriting area 28 with any writing tools. Herein, the handwritten image 29 may be characters and illustrations. In addition, a photograph selected by the user at STEP S102 shown in FIG. 3, which is described below, is printed in the handwriting area 28 as a reference image 27.

Figure 3:
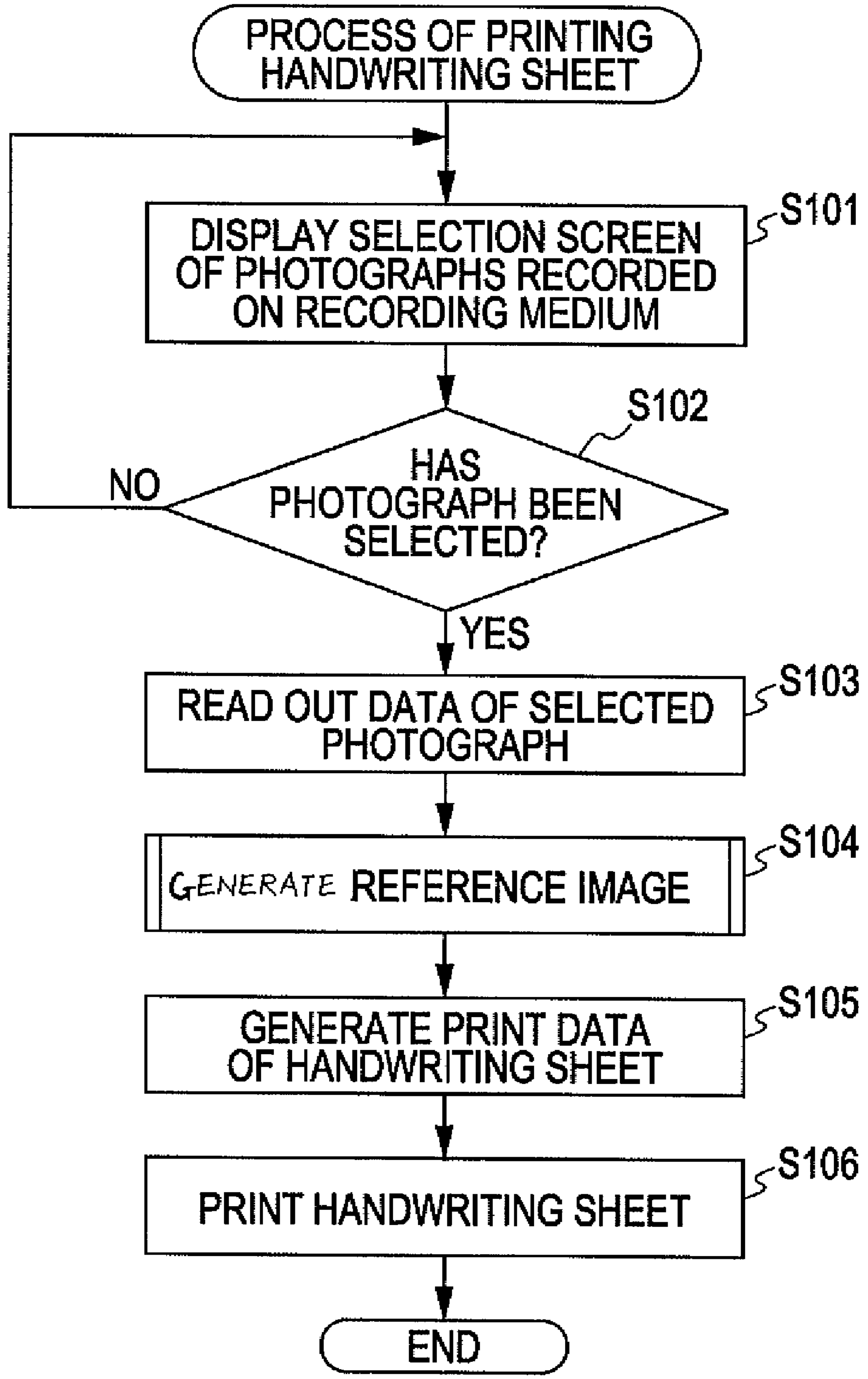
FIG. 3 is a flowchart showing a process of printing a handwriting sheet performed by a CPU of an image combining apparatus according to an exemplary embodiment 1 of the present invention.

FIG. 3 is a flowchart showing a process of printing the handwriting sheet 24 performed by the CPU 2 of the image combining apparatus 1 according to the exemplary embodiment 1.

The process described in the flowchart shown in FIG. 3 is performed when a user selects an item "print handwriting sheet" in a menu displayed on the display unit 14 of the operation panel 16.

At STEP S101, the CPU 2 of the image combining apparatus 1 loads photograph data files recorded on the recording medium 18, and displays indications corresponding to the loaded files on the display unit 14. At STEP S102, the CPU 2 monitors a user's operation on keys included in the operation unit 15 so as to check the selection of the photograph.

If the selection of the photograph has been made, the CPU 2 reads out data of the selected photograph from the recording medium 18, and stores the data in the image memory 13 at STEP S103. At STEP S104, the CPU 2 generates the reference image 27 by performing a generation process for generating a reference image described in a flowchart shown in FIG. 5, which will be described below.

At STEP S105, the CPU 2 then combines the reference image 27 generated at STEP S104 and print data of setting area, which is prestored in the program memory 4, so as to generate print data of the handwriting sheet 24. In addition, at STEP S106, the CPU 2 controls the printer unit 12 to print the handwriting sheet 24 on the basis of the generated print data.

Figure 4:
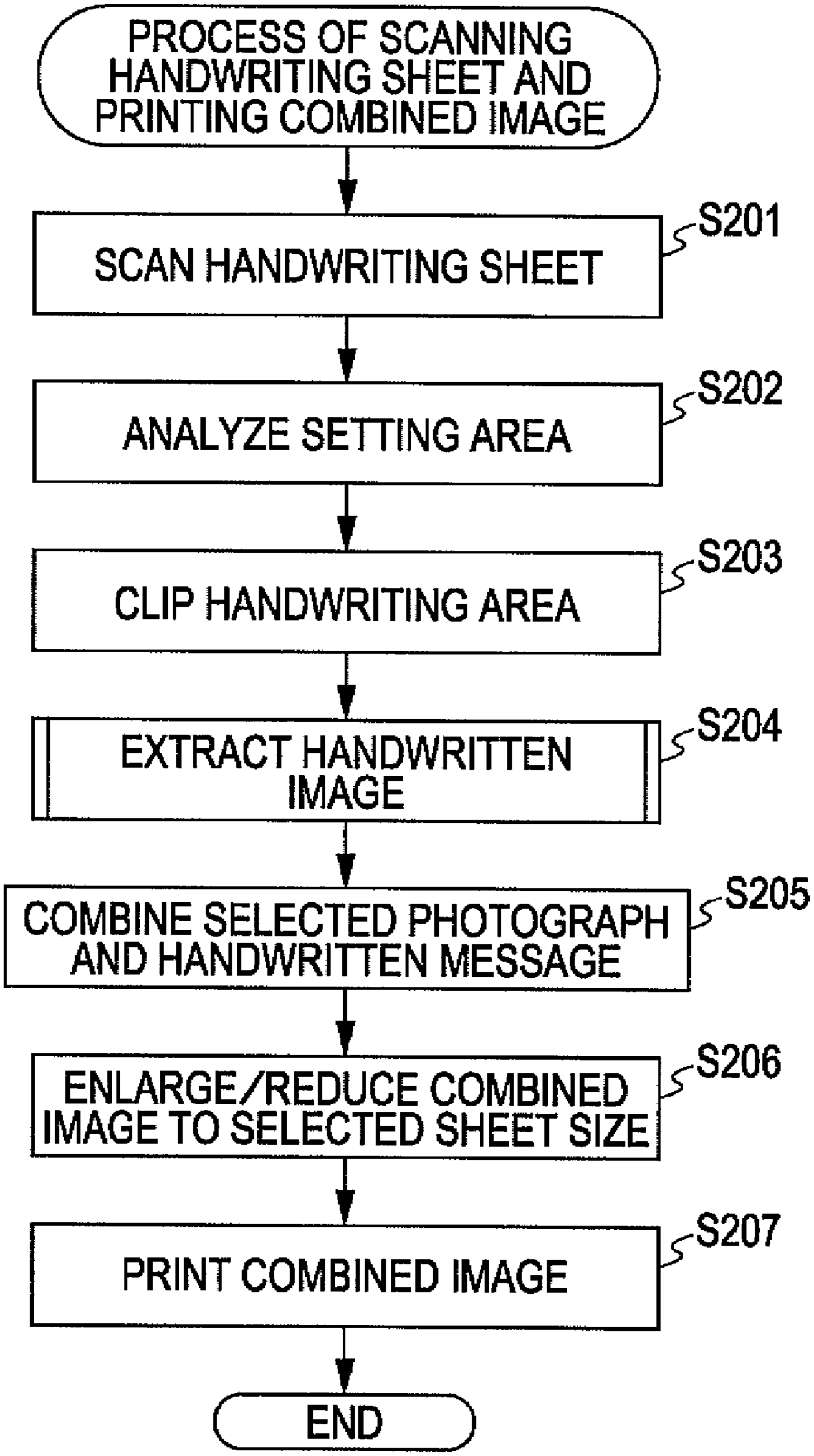
FIG. 4 is a flowchart showing a process of scanning a completed handwriting sheet and printing a combined image of a photograph and a handwritten image performed by an image combining apparatus according to an exemplary embodiment 1 of the present invention.

FIG. 4 is a flowchart of a process performed by the image combining apparatus 1 according to the exemplary embodiment 1. More specifically, FIG. 4 shows the process of scanning the completed handwriting sheet 24 and printing an image yielded by combining the selected photograph and the handwritten image 29.

The process described in the flowchart shown in FIG. 4 is performed when the user selects an item "scan handwriting sheet/print combined image" in a menu displayed on the display unit 14 of the operation panel 16. At STEP S201, the image combining apparatus 1 controls the scanner unit 7 to scan the handwriting sheet 24. The image data acquired by scanning the sheet 24 is referred to as "handwriting sheet image data".

At STEP S202, the image combining apparatus 1 clips the setting area 25 from the handwriting sheet image data and analyzes markings of the frames 26, so as to acquire the medium size selection information. At STEP S203, the image combining apparatus 1 then clips an image of the handwriting area 28 from the handwriting sheet image data scanned at STEP S201. Data of the clipped handwriting area 28 is referred to as "handwriting area image data".

At STEP S204, the CPU 2 of the image combining apparatus 1 extracts the handwritten image 29 from the handwriting area image data by performing a handwritten image extraction process that is described below in a flowchart shown in FIG. 6.

At STEP S205, the CPU 2 reads out the photograph data selected by the user at STEP S102 of the process of printing the handwriting sheet shown in FIG. 3 from the recording medium 18, and combines the photograph with the handwritten image 29 extracted at the preceding STEP S204. The combined result is referred to as "combined image data".

More specifically, data of pixels determined as the handwritten image 29 at STEP S204 is acquired from the handwriting area image data, whereas data of pixels determined as the background is acquired from the photograph data.

At STEP S206, the image combining apparatus 1 enlarges or reduces the combined image size on the basis of the medium size selection information acquired at the preceding STEP S202. The CPU 2 controls the printer unit 12 to print the combined image onto a printing medium at STEP S207.

Figure 5:
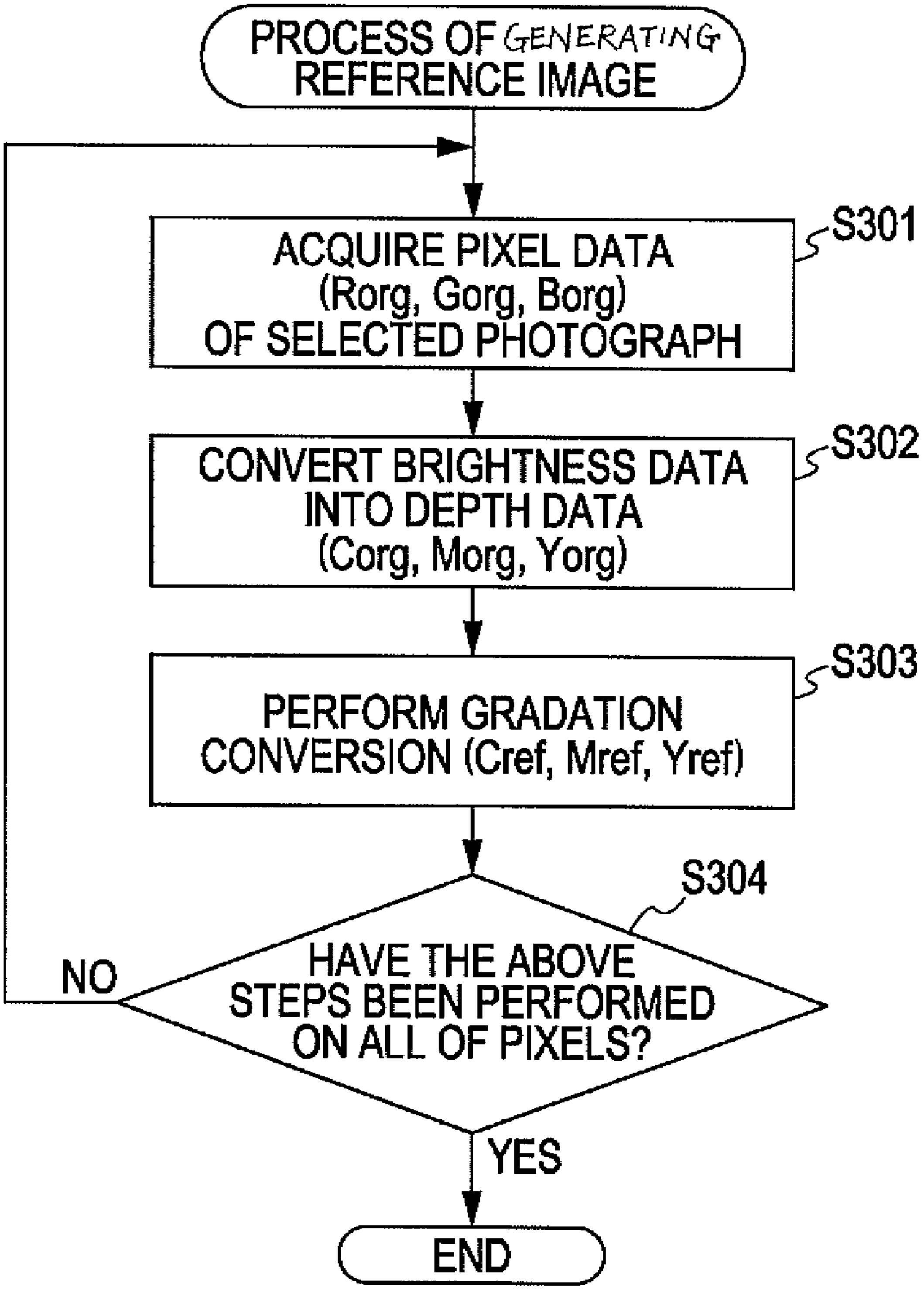
FIG. 5 is a flowchart showing a detailed process of a generating step (i.e., S104 of FIG. 3).

FIG. 5 is a flowchart showing a detailed process of the generation step (i.e., STEP S104 shown in FIG. 3).

In the generation process, STEPs S301 to S303 are repeated on all of the pixels of the photograph stored in the image memory 13.

More specifically, at STEP S301, the CPU 2 acquires brightness data ($R_{org}$, $G_{org}$, $B_{org}$) of each pixel of the photograph. At STEP S302, the CPU 2 performs a predetermined data conversion to color planes corresponding to colors of printing inks such as cyan C, magenta M, and yellow Y, such that print pixel color density data ($C_{org}$, $M_{org}$, $Y_{org}$) is acquired. The values of $C_{org}$, $M_{org}$, and $Y_{org}$ range between 0 and 255.

At STEP S303, a gradation conversion is performed using equation (1) given below so as to acquire print pixel color density data of the reference image ($C_{ref}$, $M_{ref}$, $Y_{ref}$).

$$C_{ref}=(C_{org}/255)\times C_{max}$$

$$M_{ref}=(M_{org}/255)\times M_{max}$$

$$Y_{ref}=(Y_{org}/255)\times Y_{max} \quad \text{equation (1)}$$

By repeating the above-described steps on all of the pixel data of the photograph, the reference image 27 whose printing color density is limited to ($C_{max}$, $M_{max}$, $Y_{max}$) is generated.

Figure 6:
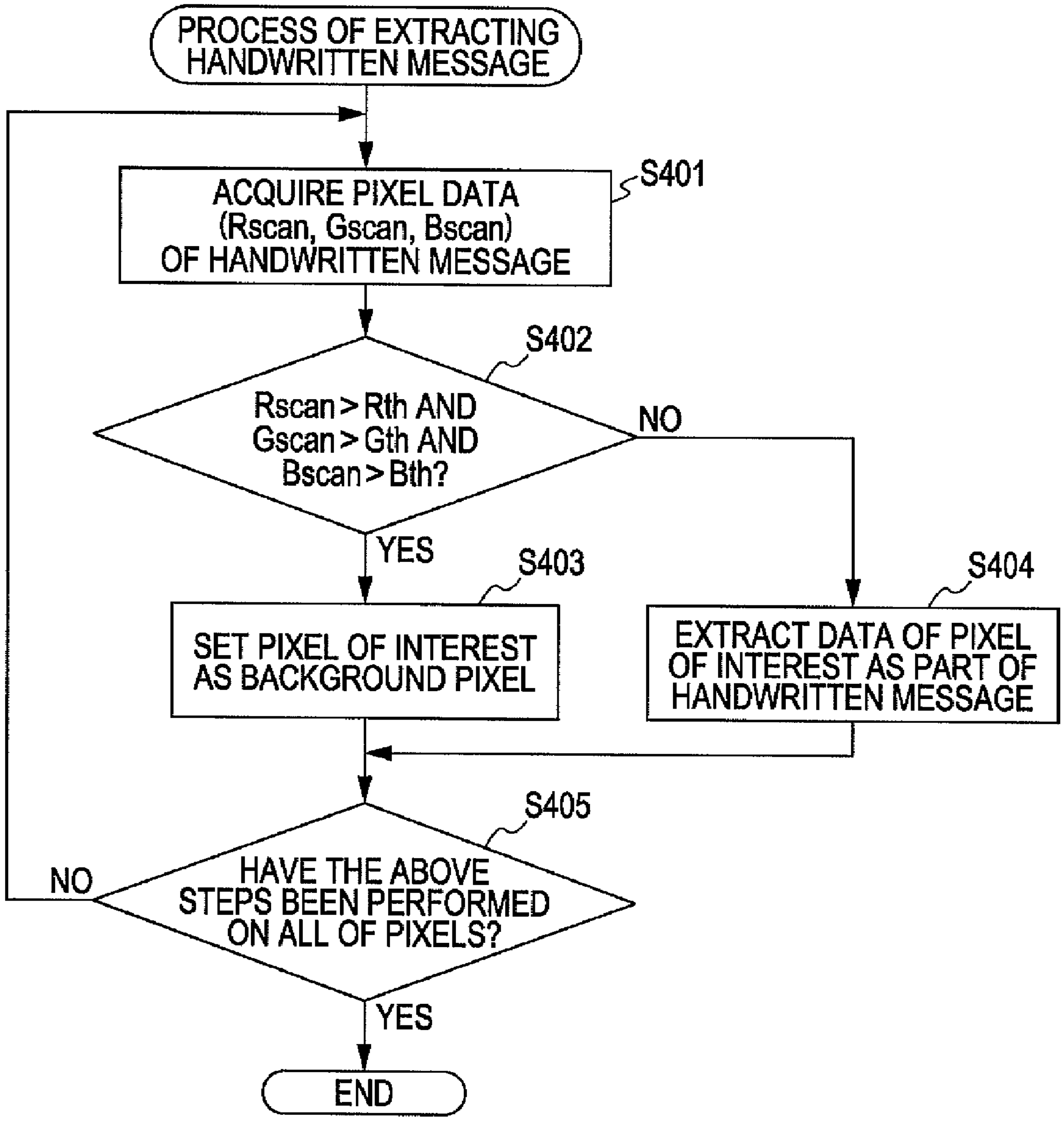
FIG. 6 is a flowchart showing a detailed process of a handwritten image extraction step (i.e., S204 of FIG. 4).

FIG. 6 is a flowchart showing a detailed process of the handwritten image extraction step (i.e., STEP S204 shown in FIG. 4).

In the handwritten image extraction process, STEPs S401 to S404 are repeated on all of the pixels of the handwriting area image data stored in the image memory 13.

At STEP S401, the CPU 2 acquires brightness data ($R_{scan}$, $G_{scan}$, $B_{scan}$) of each pixel of the handwriting area image data. At STEP S402, the CPU 2 determines whether or not the brightness values of the color planes of each pixel exceed predetermined threshold values ($R_{th}$, $G_{th}$, $B_{th}$). More specifically, the CPU 2 determines whether or not equation (2) given below is satisfied.

$$R_{scan}>R_{th}$$

$$G_{scan}>G_{th}$$

$$B_{scan}>B_{th} \quad \text{equation (2)}$$

When equation (2) is satisfied, the pixel of interest of the handwriting area image data has the levels exceeding the predetermined threshold levels (that is, the color density of the image printed on the printing medium is lower than predetermined levels), and the process proceeds to STEP S403. At STEP S403, the CPU 2 determines that the pixel of interest is included in the background. In contrast, when equation (2) is not satisfied, the color density of the image printed on the printing medium is at or higher than the predetermined levels, and the process proceeds to STEP S404. At STEP S404, the CPU 2 determines that the pixel of interest is included in the handwritten image 29.

Each of the constants $R_{th}$, $G_{th}$, $B_{th}$ are set so that the values of the brightness data acquired by scanning the reference image 27 with the scanner unit 7 do not fall below the brightness levels $R_{th}$, $G_{th}$, $B_{th}$. The reference image 27, scanned here, having limited color density levels and generated in the generation process is printed by the printer unit 12.

Figure 7:
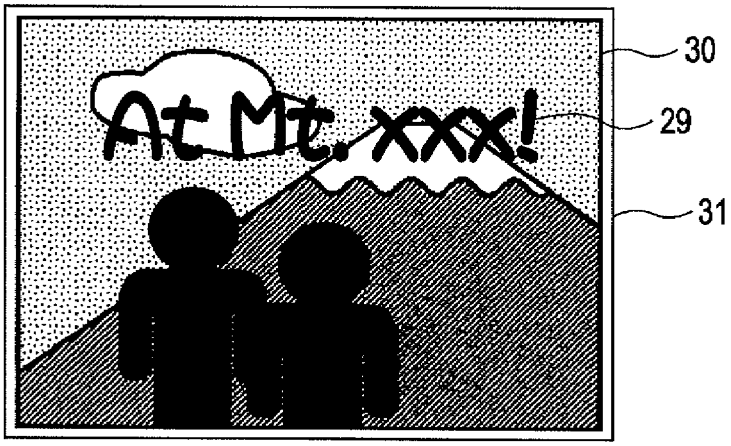
FIG. 7 shows a printed image of the combined result according to an exemplary embodiment 1 of the present invention.

FIG. 7 shows an example output image of the combined result according to the exemplary embodiment 1.

As is clear from FIG. 7, the handwritten image 29 written in the handwriting area 28 is superimposed on the photograph 30 to yield the combined result. The combined result is then enlarged or reduced to the size selected with the medium size selection frames 26, and printed on a printing medium 31.

By configuring the image combining apparatus 1 as described above, a user can write the handwritten image 29 over the reference image 27 printed in the handwriting area 28 of the handwriting sheet 24. Thus, the user can write the handwritten image 29 while recognizing the positional relationship between the handwritten image 29 and the photograph 30 to be superimposed and combined.

Exemplary Embodiment 2

In an exemplary embodiment 2 of the present invention, only a predetermined color plane (e.g., cyan) is used to print a reference image 27.

The exemplary embodiment 2 employs the same configuration of a handwriting sheet 24, the same process of printing the handwriting sheet 24, and the same process of scanning the handwriting sheet 24 and printing a combined result as those described in the exemplary embodiment 1 referred to FIGS. 2, 3, and 4. In the exemplary embodiment 2, only a process invoked by a generation step (i.e., STEP S104 shown in FIG. 3) differs from that performed in the exemplary embodiment 1.

Figure 8:
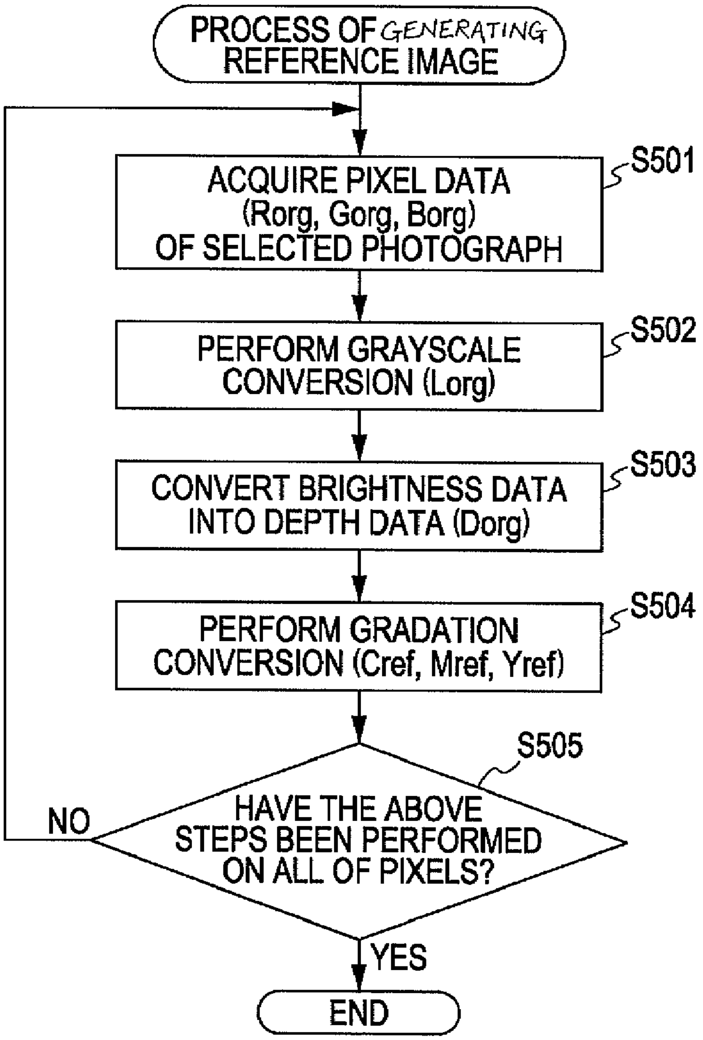
FIG. 8 is a flowchart showing a detailed process of a generating step according to an exemplary embodiment 2 of the present invention.

FIG. 8 is a flowchart showing a detailed process of the generation step according to the exemplary embodiment 2.

At STEP S501, a CPU 2 acquires brightness data ($R_{org}$, $G_{org}$, $B_{org}$) of each pixel of a selected photograph. At STEP S502, grayscale brightness data $L_{org}$ is acquired from the brightness data of RGB color planes using equation (3) given below.

$$L_{org}=(R_{org}+G_{org}+B_{org})/3 \quad \text{equation (3)}$$

In equation (3), the grayscale brightness data $L_{org}$ is determined by simply averaging the values of the brightness data of the RGB color planes. However, the grayscale brightness data $L_{org}$ may be determined by multiplying the values of the brightness data of each of the RGB color planes by different coefficients, and then averaging the multiplied values.

At STEP S503, the image combining apparatus 1 performs a predetermined data conversion to acquire print pixel color density data $D_{org}$, which ranges between 0 and 255.

At STEP S504, the image combining apparatus 1 then performs a gradation conversion using equation (4) given below so as to acquire print pixel color density data of the reference image ($C_{ref}$, $M_{ref}$, $Y_{ref}$).

$$C_{ref}=(D_{org}/255)\times C_{max}$$

$$M_{ref}=0$$

$$Y_{ref}=0 \quad \text{equation (4)}$$

By repeating the above-described steps on all of the pixels of the selected photograph, reference image 27, which is printed only using the cyan ink with the color density of cyan being limited to $C_{max}$, is generated.

The exemplary embodiment 2 employs the same detailed process of a handwritten image extraction step as that (i.e., the process shown in FIG. 6) of the exemplary embodiment 1. However, in the exemplary embodiment 2, the reference image is printed only using cyan ink. When an image printed only using the cyan ink is scanned, a value of the R-channel of the scanned image is affected. Thus, in the exemplary embodiment 2, values of $G_{th}$ and $B_{th}$ of equation (2) can be set larger than that of $R_{th}$.

By configuring the image combining apparatus 1 as described above, the larger threshold values can be set for color planes other than that used in printing the reference image 27. This enables more accurate extraction of the handwritten image 29 even if pale colors are used to write the handwritten image 29.

In addition, in the exemplary embodiment 2, only the cyan is used in printing the reference image 27, however, another color can be used. This also provides similar advantages.

Furthermore, the process of printing the handwriting sheet 24 may include a step of selecting a color to be used in printing the reference image 27. This allows the user to select the color to be used in printing the reference image 27 in accordance with the color of the writing tool used. Moreover, the handwritten image 29 can be extracted more accurately.

Exemplary Embodiment 3

In an exemplary embodiment 3 of the present invention, a contour extraction operation is performed on an original photograph when a reference image 27 is printed.

The exemplary embodiment 3 employs the same configuration of a handwriting sheet 24, the same process of printing the handwriting sheet 24, and the same process of scanning the handwriting sheet 24 and printing a combined result as those described in the exemplary embodiment 1 or 2. In the exemplary embodiment 3, only a detailed process of a generation step differs from that performed in the exemplary embodiment 1 or 2.

Figure 9:
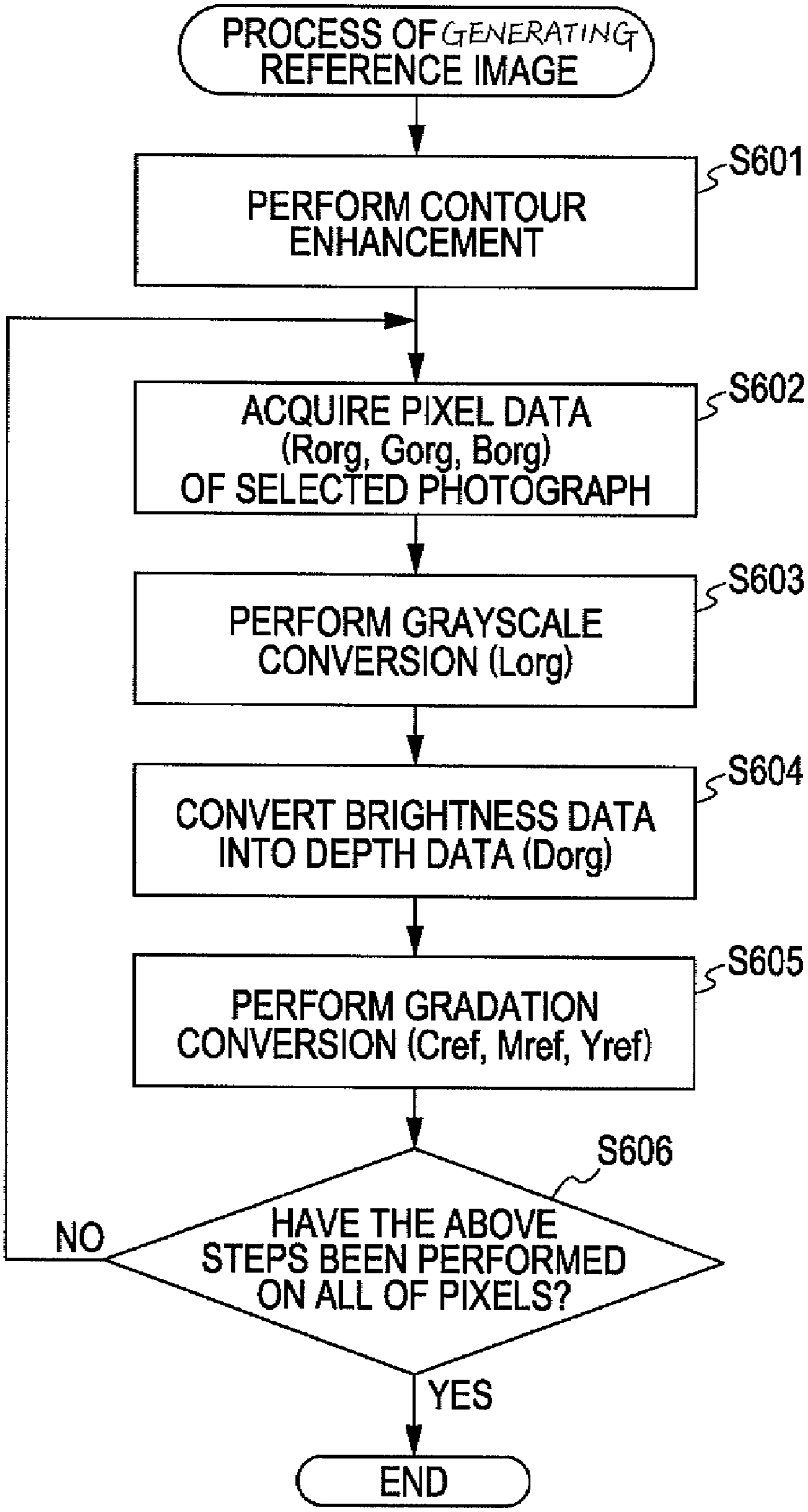
FIG. 9 is a flowchart showing a detailed process of a generating step according to an exemplary embodiment 3 of the present invention.

FIG. 9 is a flowchart showing a detailed process of the generation step according to the exemplary embodiment 3.

The generation process according to the exemplary embodiment 3 differs from that according to the exemplary embodiment 2 only in having the contour extraction step (i.e., STEP S601). STEPs S602 to S605 shown in FIG. 9 correspond to STEPs S501 to S504 (FIG. 8) of the generation process performed in the exemplary embodiment 2.

FIGS. 10A, 10B, 10C, and 10D show an example reference image 27*a* generated in the exemplary embodiment 3.

Figure 10A:
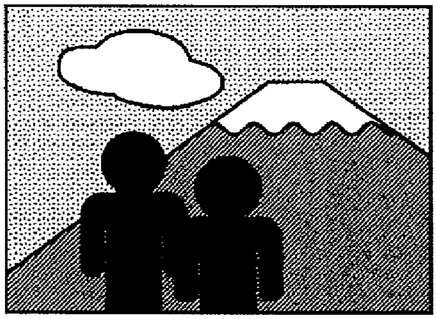
FIGS. 10A, 10B, 10C, and 10D show an exemplary reference image created in an exemplary embodiment 3 of the present invention.
Figure 10B:
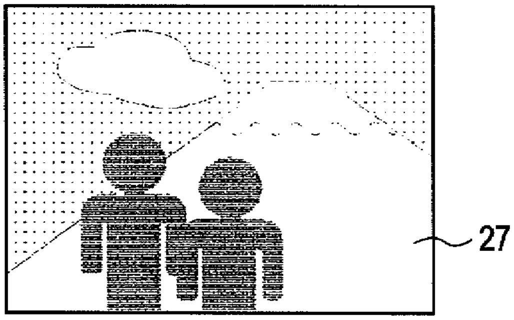

FIG. 10A shows an original photograph. FIG. 10B shows an example reference image 27 generated according to the generation process described in the exemplary embodiment 2. As shown in FIG. 10B, printing the original photograph simply with its color density being decreased causes a degradation in the gradation. Thus, it becomes difficult for a user to recognize the original image.

Figure 10C:
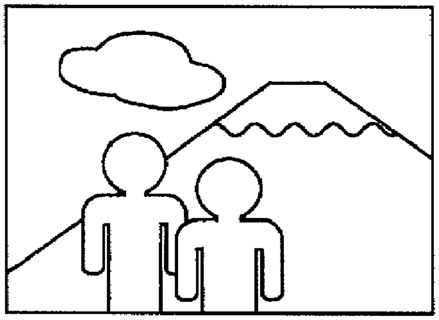
Figure 10D:
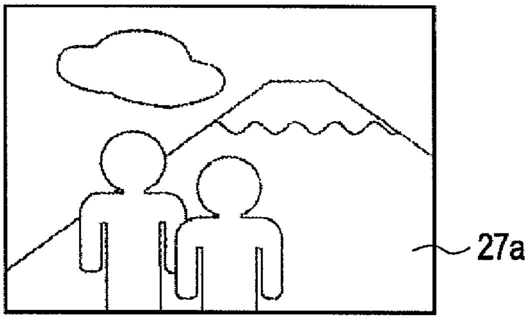

To overcome this disadvantage, as shown in FIG. 10C, the contour extraction operation is performed on the original photograph data in the exemplary embodiment 3. Accordingly, a reference image 27*a* shown in FIG. 10D is generated.

More specifically, FIG. 10C shows an image acquired after performing the contour extraction operation on the original photograph data. FIG. 10D shows the reference image 27*a* having a decreased color density and an enhanced contour.

As described above, generation of a lighter reference image after performing the contour extraction operation increases the distinguishablity of a position of the reference image 27.

Exemplary Embodiment 4

In an exemplary embodiment 4 of the present invention, data of a reference image 27 is stored when printing the reference image 27. In a handwritten image extraction process, a handwritten image 29 is extracted by acquiring the difference between the stored reference image data 27 and handwriting area image data.

The exemplary embodiment 4 employs the same configuration of a handwriting sheet 24, the same process of printing the handwriting sheet 24, and the same process of scanning the handwriting sheet 24 and printing a combined result as those described in the exemplary embodiment 1 referred to FIGS. 2, 3, and 4. In the exemplary embodiment 4, only detailed processes of a generation step (i.e., STEP S104 shown in FIG. 3) and a handwritten image extraction step (i.e., STEP S204 shown in FIG. 4) differ from those performed in the exemplary embodiment 1.

Figure 11:
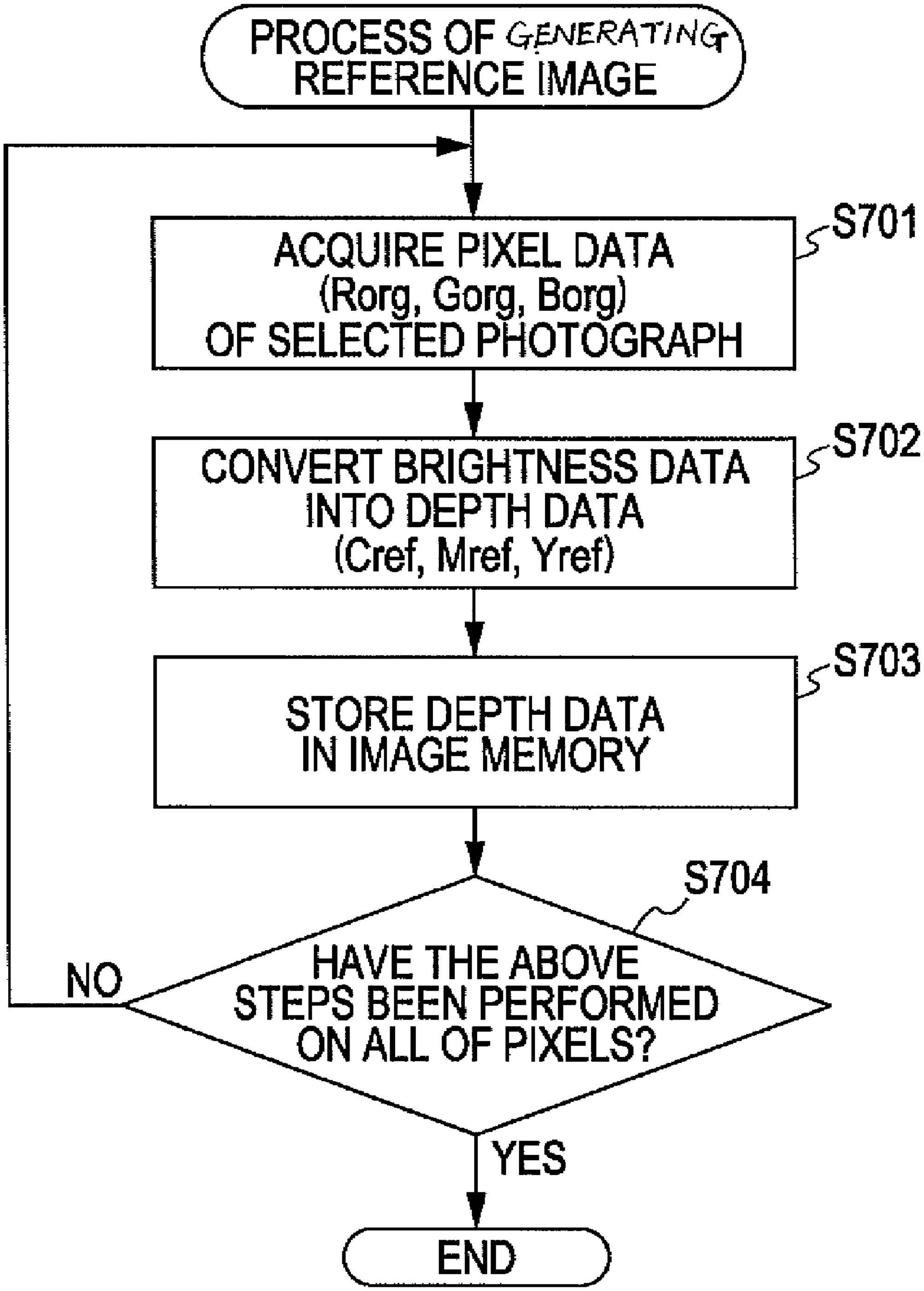
FIG. 11 is a flowchart showing a detailed process of a generating step according to an exemplary embodiment 4 of the present invention.

FIG. 11 is a flowchart showing a detailed process of the generation step according to the exemplary embodiment 4.

At STEP S701, a CPU 2 acquires brightness data ($R_{org}$, $G_{org}$, $B_{org}$) of each pixel of a selected photograph. At STEP S702, the CPU 2 performs a predetermined data conversion to color planes corresponding to colors of printing inks such as cyan C, magenta M, and yellow Y, such that print pixel color density data of the reference image ($C_{ref}$, $M_{ref}$, $Y_{ref}$) is acquired.

$C_{ref}$, $M_{ref}$, and $Y_{ref}$ have values ranging between 0 and 255 and are used as the print pixel color density data of the reference image. At STEP S703, the print pixel color density data of the reference image is stored in an image memory 13.

Figure 12:
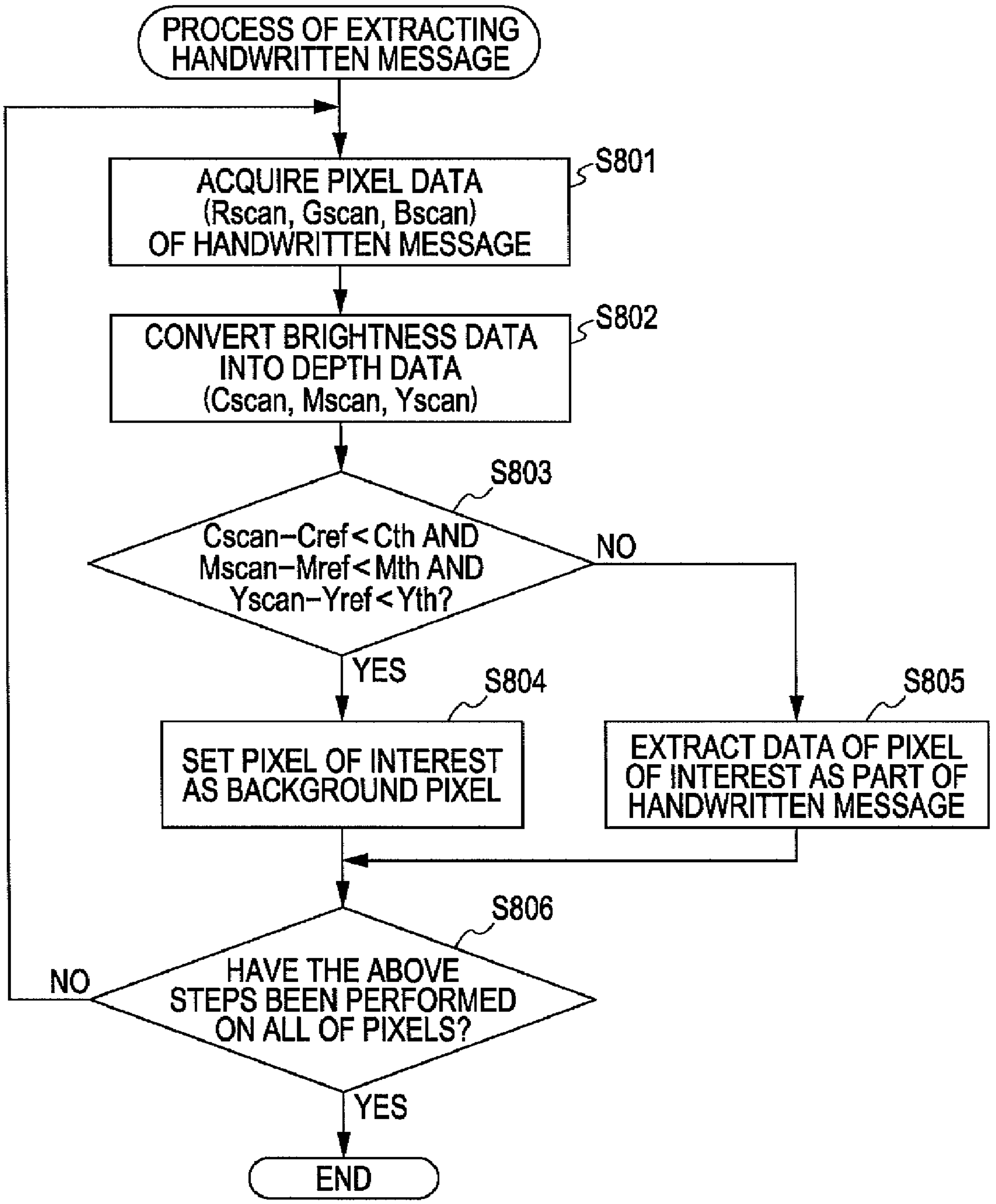
FIG. 12 is a flowchart showing a detailed process of a handwritten image extracting step according to an exemplary embodiment 4 of the present invention.

FIG. 12 is a flowchart showing a detailed process of the handwritten image extraction step according to the exemplary embodiment 4.

At STEP S801, the CPU 2 acquires brightness data ($R_{scan}$, $G_{scan}$, $B_{scan}$) of each pixel of the handwriting area image data. At STEP S802, the CPU 2 performs the same data conversion to CMY color planes as that performed in the reference image generation process so as to acquire color density data ($C_{scan}$, $M_{scan}$, $Y_{scan}$). At STEP S803, the CPU 2 compares the color density data ($C_{scan}$, $M_{scan}$, $Y_{scan}$) and the print pixel color density data of the reference image stored in the image memory 13. More specifically, the CPU 2 determines whether or not equation (5) is satisfied.

$$C_{scan}-C_{ref}<C_{th}$$

$$M_{scan}-M_{ref}<M_{th}$$

$$Y_{scan}-Y_{ref}<Y_{th} \quad \text{equation (5)}$$

When equation (5) is satisfied, the difference between the pixel of interest of the handwriting area image data and the pixel of interest of the reference image 27 is lower than predetermined levels. Thus, at STEP S804, the CPU 2 determines that the pixel of interest is included in the background. In contrast, when equation (5) is not satisfied, the difference in color density between the pixel of interest of the handwriting area image data and the pixel of interest of the reference image 27 is at or higher than the predetermined levels. Thus, at STEP S805, the CPU 2 determines that the pixel of interest is included in the handwritten image 29.

With this configuration, the reference image 27 can be processed without decreasing its color density, thereby providing improved noticeability of the reference image 27 to a user when the user writes the handwritten image 29.

In the exemplary embodiment 4, the print data of the reference image 27 is stored in the process of printing the reference image 27. The difference between the stored print data of the reference image 27 and the handwriting area image data is then acquired in the handwritten image extraction process. However, instead of storing the print data of the reference image 27, the same process as that performed in the reference image generation process may be re-executed to create the reference image data. The reference image data and the handwriting area image data may then be compared. This also provides similar advantages.

Exemplary Embodiment 5

In an exemplary embodiment 5 of the present invention, an image combining apparatus 1 has two combination modes, i.e., a superimpose combination mode and a line-up combination mode. In the superimpose combination mode, the image combining apparatus 1 combines a photograph 30 and a handwritten image 29 by superimposing the handwritten image 29 on the photograph 30. In the line-up combination mode, the image combining apparatus 1 combines the photograph 30 and the handwritten image 29 by lining them up.

Figure 13A:
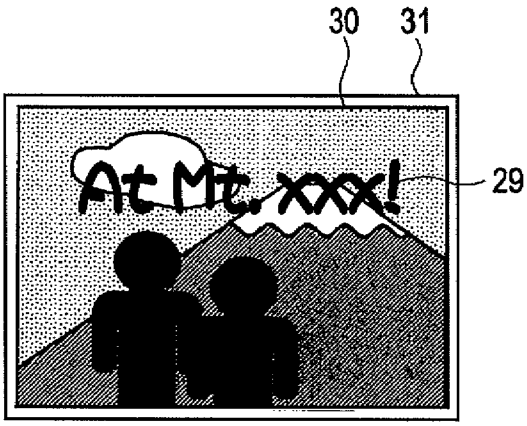
FIGS. 13A and 13B show printed images of combined results according to an exemplary embodiment 5 of the present invention.
Figure 13B:
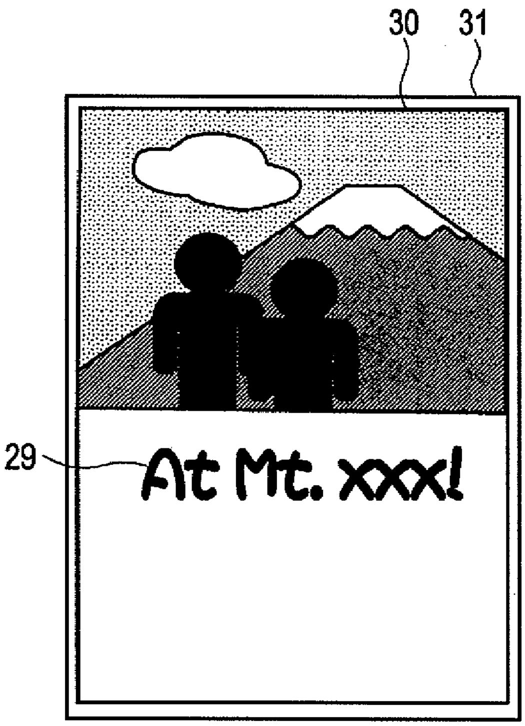

FIGS. 13A and 13B show example output images of the combined results according to the exemplary embodiment 5.

FIG. 13A shows the example output image of the combined result acquired in the superimpose combination mode. As is clear from FIG. 13A, the handwritten image 29 written in a handwriting area 28 is superimposed on the photograph 30 to yield the combined result. The combined result is then enlarged or reduced to the size selected with medium size selection frames 26, and printed on a printing medium 31.

FIG. 13B shows the example output image of the combined result acquired in the line-up combination mode. As shown in FIG. 13B, the photograph 30 and the handwritten image 29 written in the handwriting area 28 are lined up (in FIG. 13B, up and down) to yield the combined result. The combined result is then enlarged or reduced to the size selected with the medium size selection frames 26 disposed in a setting area 25, and printed on the printing medium 31.

Figure 14:
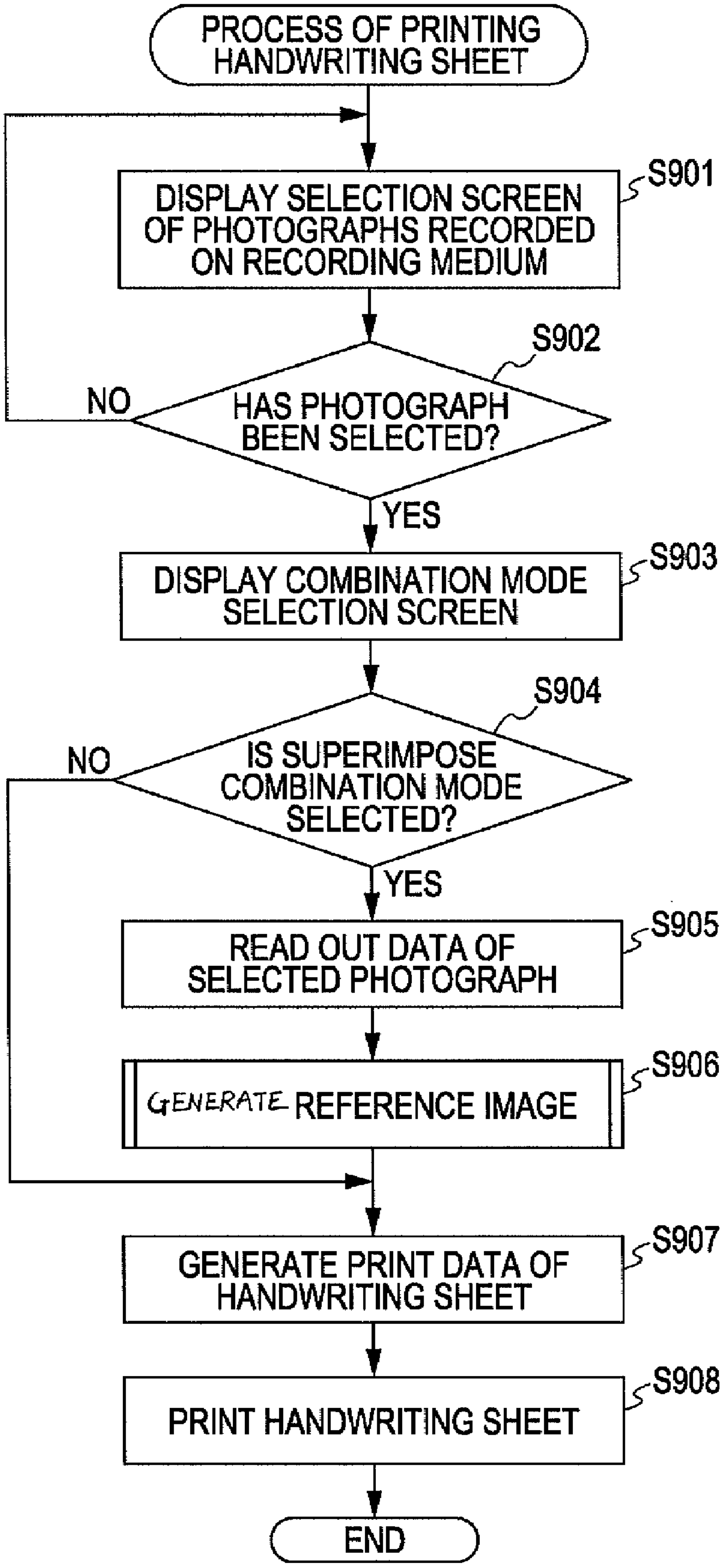
FIG. 14 is a flowchart showing a process of printing a handwriting sheet performed by a CPU of an image combining apparatus according to an exemplary embodiment 5 of the present invention.

FIG. 14 is a flowchart showing a process of printing a handwriting sheet 24 performed by the CPU 2 of the image combining apparatus 1 according to the exemplary embodiment 5.

At STEP S901, the CPU 2 loads photograph data files recorded on the recording medium 18, and displays indications corresponding to the loaded files on a display unit 14. At STEP S902, the CPU 2 monitors a user's operation on keys included in an operation unit 15 so as to check the selection of the photograph. If the selection of the photograph has been made, the process proceeds to STEP S903. At STEP S903, the CPU 2 displays a selection screen allowing a user to select either the superimpose combination mode or the line-up combination mode to use. The image combining apparatus 1 stands by until the user selects either mode by operating the keys included in the operation unit 15.

If the superimpose combination mode is selected at STEP S904, the process proceeds to STEP S905. At STEP S905, the CPU 2 reads out data of the selected photograph from the recording medium 18, and stores the data in an image memory 13. At STEP S906, the CPU 2 generates the reference image 27.

The reference image generation step performed at STEP S906 may be the same step performed in one of the exemplary embodiments 1 to 4.

At STEP S907, the CPU 2 then combines the reference image 27 generated at STEP S906 and printing data for setting area, which is prestored in a program memory 4, so as to generate print data of the handwriting sheet 24. In addition, at STEP S908, the CPU 2 controls a printer unit 12 to print the handwriting sheet 24 on the basis of the generated print data.

On the other hand, if the line-up combination mode is selected at STEP S904, the process proceeds to STEP S907. At STEP S907, the CPU 2 generates the print data of the handwriting sheet 24. In this case, the reference image 27 is not printed in the handwriting area 28 of the handwriting sheet 24. At STEP S908, the CPU 2 controls a printer unit 12 to print the handwriting sheet 24 on the basis of the generated print data.

With this configuration, the reference image 27 is printed in the handwriting area 28 only when the user selects the superimpose combination mode.

According to the exemplary embodiment 5, the reference image 27 is not printed in the handwriting sheet 24 when the user selects the line-up combination mode. However, in the line-up combination mode, the reference image 27 may be printed in an area other than the handwriting area 28 of the handwriting sheet 24 so as to allow the user to recognize the position and direction of the photograph. In such a case, the different reference image generation processes are performed in the superimpose combination mode and the line-up combination mode. This can provide an optimum noticeability of the reference image 27 to a user in each mode.

Exemplary Embodiment 6

The above-described exemplary embodiments 1 to 5 employ a storage medium 18 as an image input device for providing photograph data.

In an exemplary embodiment 6 of the present invention, the photograph data is provided using the same scanning unit as that used for scanning a handwriting sheet 24. In addition, the photograph data may be acquired from an external device via a communication line 23 or an interface 20.

Exemplary Embodiment 7

In an exemplary embodiment 7 of the present invention, when printing a reference image 27, a negative-positive reversing operation is performed on an original photograph if necessary.

The exemplary embodiment 7 employs the same configuration of a handwriting sheet 24, process of printing the handwriting sheet 24, and process of scanning the handwriting sheet 24 and printing a combined result as those described in the exemplary embodiment 1 or 2. In the exemplary embodiment 7, only a detailed process of a reference image generation step differs from that performed in the exemplary embodiment 1 or 2.

Figure 15:
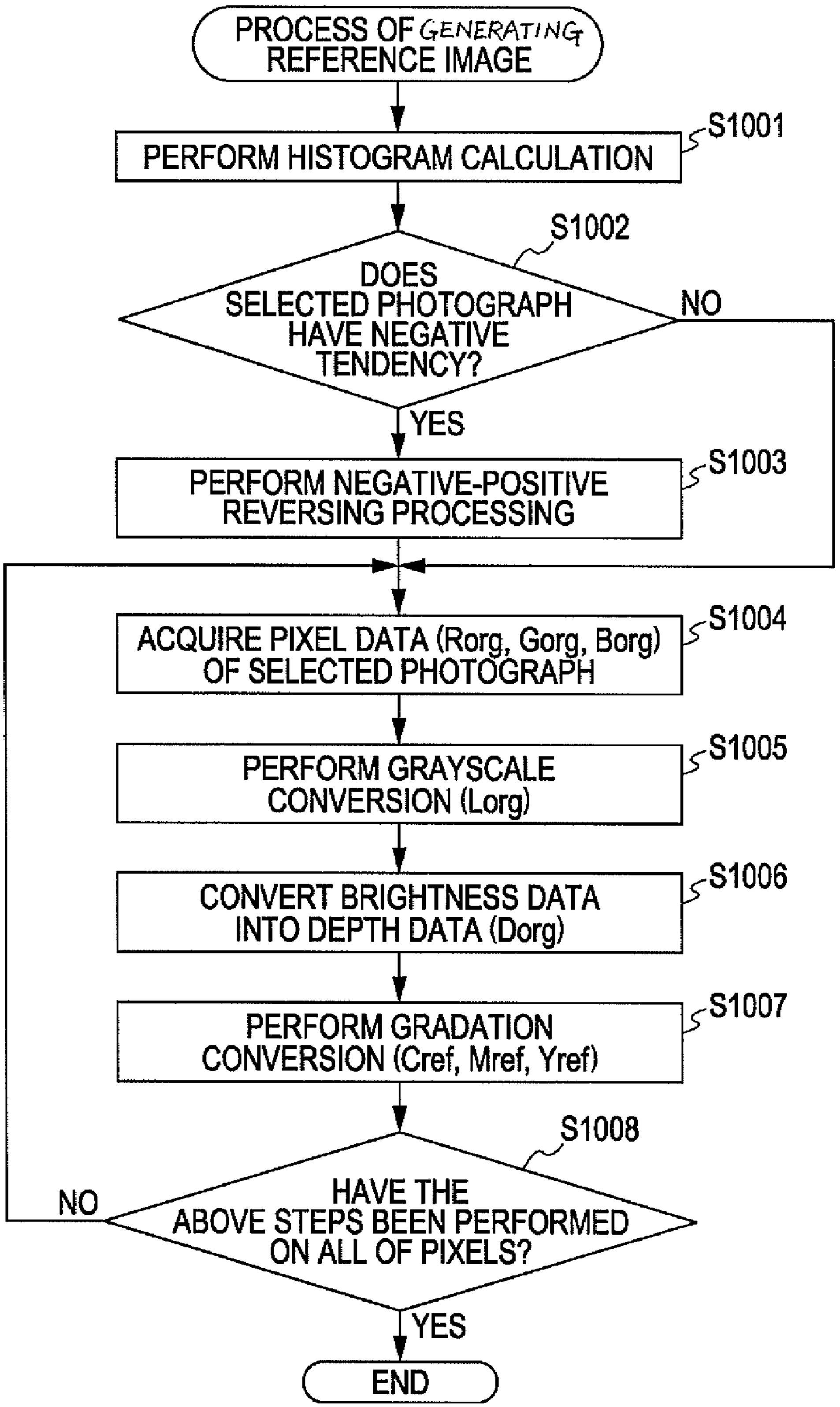
FIG. 15 is a flowchart showing a detailed process of a generating step according to an exemplary embodiment 7 of the present invention.

FIG. 15 is a flowchart showing a detailed process of the reference image generation step according to the exemplary embodiment 7.

The reference image generation process according to the exemplary embodiment 7 differs from that performed in the exemplary embodiment 2 in having a histogram calculating step (i.e., S1001), a negative tendency determining step (i.e., S1002), and a negative-positive reversing step (i.e., S1003). STEPs S1004 to S1007 shown in FIG. 15 correspond to STEPs S501 to S504 of the reference image generation process according to the exemplary embodiment 2.

FIGS. 16A, 16B, 16C, and 16D show example reference images 27 generated in the exemplary embodiment 7.

Figure 16A:
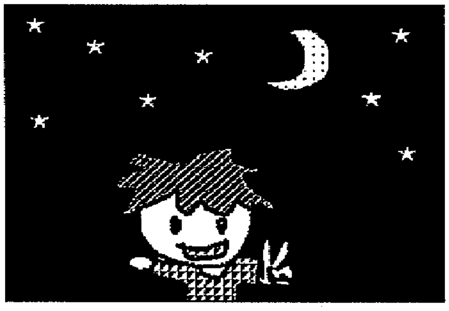
FIGS. 16A, 16B, 16C, and 16D show an exemplary reference image generated in an exemplary embodiment 7 of the present invention.

FIG. 16A shows an original photograph. The original photograph, which may be a photograph of a night view for example, has a negative tendency (i.e., the ratio of dark pixels to all pixels is high).

Figure 16B:
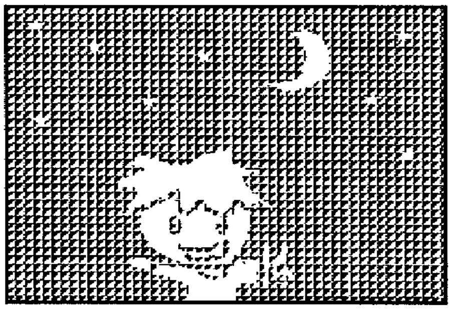

FIG. 16B shows an example reference image 27 generated from the original photograph shown in FIG. 16A according to the reference image generation process described in the exemplary embodiment 2. As is clear from FIG. 16B, when the original photograph having the negative tendency is printed with its color density being decreased, the reference image 27 is more likely to include a large dark area although the color density of the image is lighter than that of the original.

If the reference image 27 includes the large dark area, the background may be enhanced rather than a subject depending on the characteristics of the original image, thereby making it difficult to recognize the original image.

In addition, the color of the handwritten image 29 written by the user over the reference image 27 may be affected by the color of the reference image 27. Thus, it is undesirable for the reference image 27 to include a large dark area.

Furthermore, with respect to the accuracy of a process of extracting the handwritten image 29 from a handwriting area 28, it is also undesirable for the reference image 27 to include the large dark area.

Figure 16C:
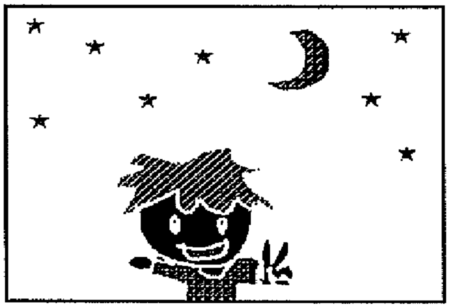

Accordingly, in the exemplary embodiment 7, as shown in FIG. 16C, the negative-positive reversing operation is performed at STEP S1003, only when the reference image is determined to have the negative tendency in the negative tendency determining operation at STEP S1002 after performing the histogram calculation at STEP S1001.

Figure 16D:
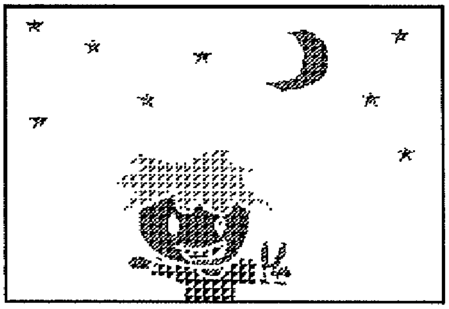

FIG. 16D shows an example reference image 27, generated from an image shown in FIG. 16C, having undergone the negative-positive reversing operation, with the color density being decreased.

When the reference image 27 is determined to have a positive tendency in the negative-positive determining operation at STEP S1002 shown in FIG. 15, the negative-positive reversing operation is not performed at STEP S1003.

As described above, after performing the histogram calculation and the negative-positive determining operation, the negative-positive reversing operation is performed only on photographs having the negative tendency, thereby enabling the reference image 27 to always have the positive tendency. This can increase the distinguishablity of the positional relationship between the reference image and the handwritten image, the color reproducibility of the handwritten image, and the accuracy of the handwritten image extraction process.

Exemplary Embodiment 8

Figure 17:
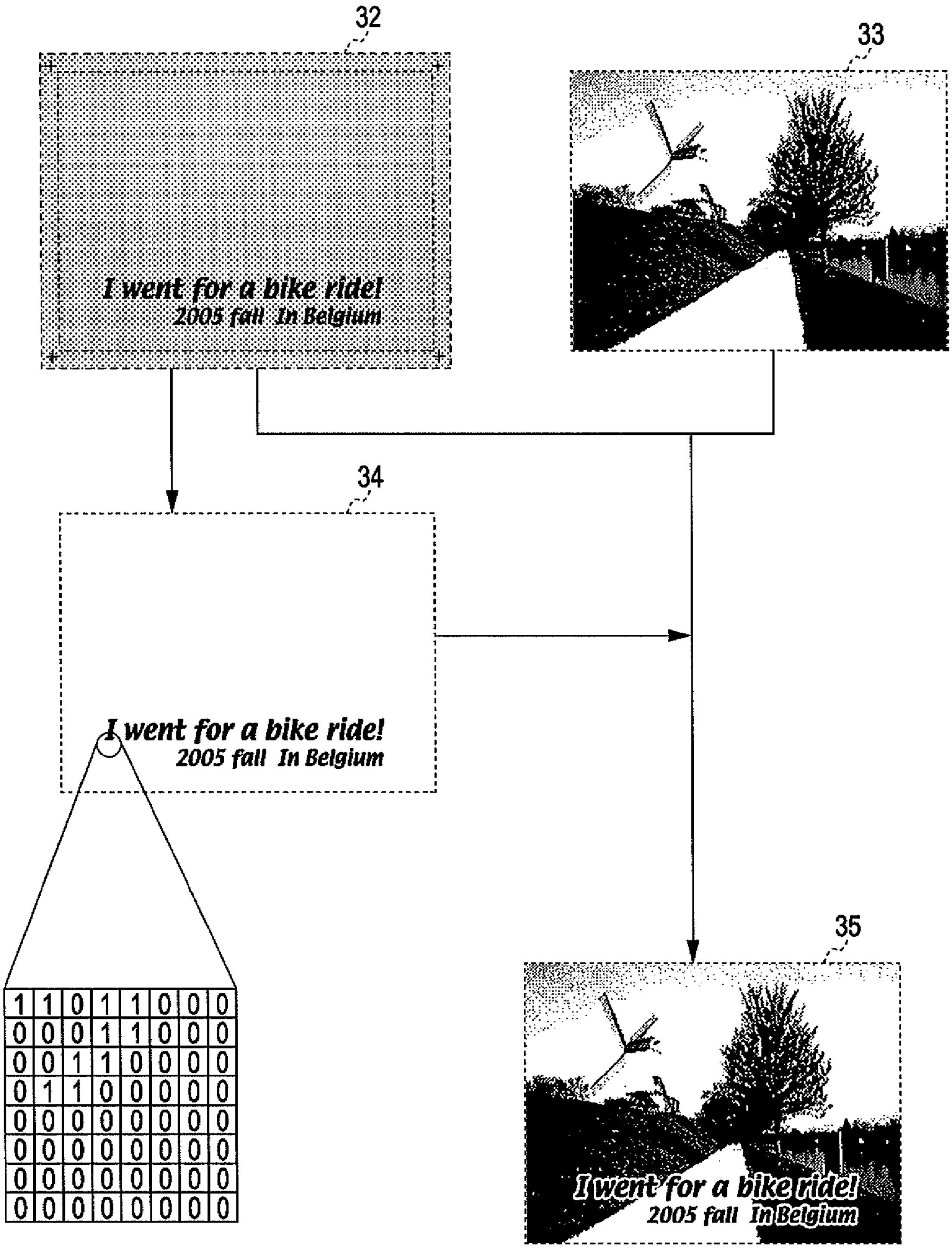
FIG. 17 shows a summary of an exemplary embodiment 8 of the present invention.

Now, referring to FIG. 17, a summary of an exemplary embodiment 8 of the present invention will be described.

In the exemplary embodiment 8, in a method of scanning a handwritten image, handwritten characters/illustrations are combined with a photograph while removing data of a reference image or a marker printed on the background. In addition, the exemplary embodiment 8 enables the color of outlines or painted closed area to be changeable when a mode for adding outlines around the handwritten characters or a mode for painting closed areas is set.

In the exemplary embodiment 8, mask data 34 is generated in order to yield a combined image 35 while removing the data of the reference image printed on the background. In the mask data 34, a value "1" represents pixels where image data of a handwriting area is used, whereas a value "0" represents those where image data of the selected photograph is used. Referring to the mask data 34, the handwritten image 32 and the photograph 33 are combined such that an output image of the combined result 35 is acquired. When generating the mask data 34, requested image processing is also considered.

Now, a process of yielding such a printed image of the combined result will be described in detail according to the exemplary embodiment 8.

Figure 18:
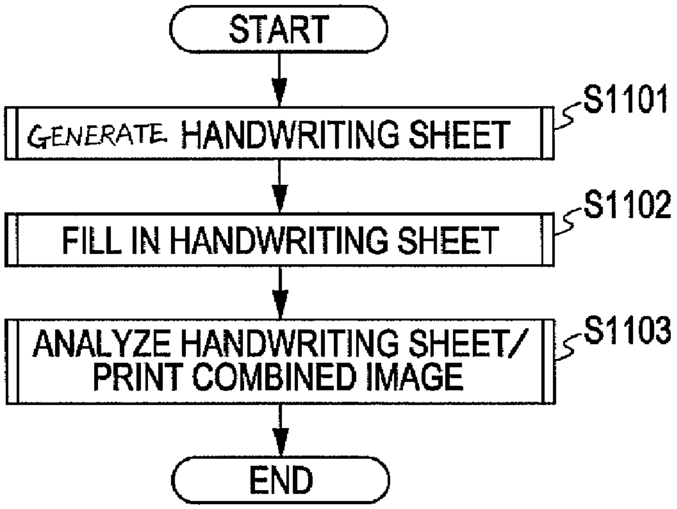
FIG. 18 is a flowchart showing a whole process performed in an exemplary embodiment 8 of the present invention.

FIG. 18 is a flowchart of a process performed in the exemplary embodiment 8. More specifically, FIG. 18 shows a summary of a whole process of generating and printing the combined result according to the method of scanning the handwritten image, which has been described referring to FIG. 17.

The process of generating and printing the combined image according to the method of scanning the handwritten image includes three steps. More specifically, the process includes the steps of generating a handwriting sheet 24 (i.e., S1101), filling in the handwriting sheet 24 (i.e., S1102), and analyzing the handwriting sheet and printing the combined image (i.e., S1103).

First, the handwriting sheet 24 is generated.

Figure 19:
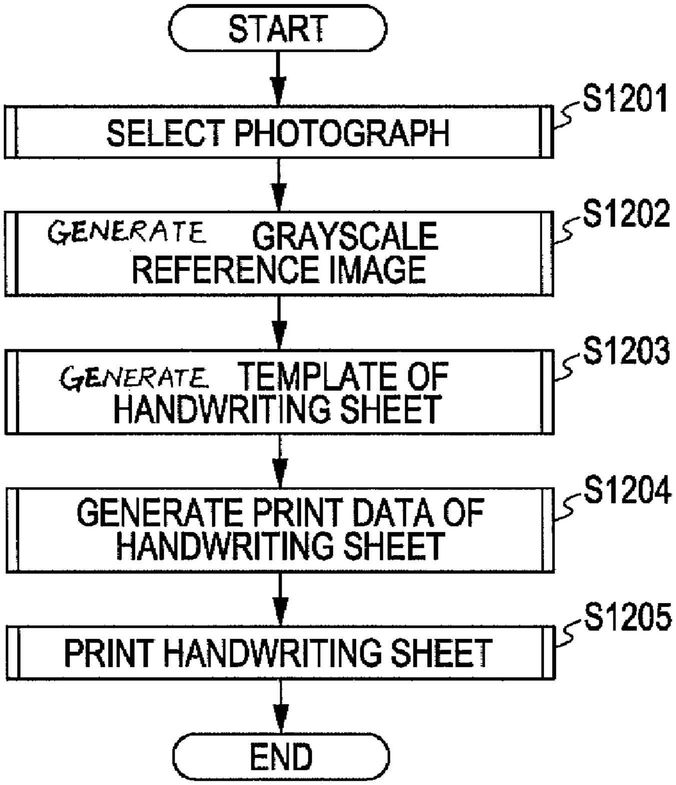
FIG. 19 is a flowchart showing a process of generating a handwriting sheet.

FIG. 19 is a flowchart showing a process of generating the handwriting sheet 24 controlled by a CPU 2.

At STEP S1201, the CPU 2 allows a user to select a photograph to be combined. The user selects the photograph from those recorded on a recording medium such as a memory card, connected via a recording medium interface, with an operation unit 15 and a display unit 14. By selecting the photograph at STEP S1201, the address of the selected photograph data on the recording medium may be printed on the handwriting sheet 24 as identification information such as a barcode. Including the address of the selected photograph data in the handwriting sheet 24 enables the photograph data to be automatically selected in the process of analyzing the handwriting sheet 24.

At STEP S1202, the CPU 2 generates a grayscale image to be printed as the reference image on the background from the photograph data selected at STEP S1201. At this time, the CPU 2 performs gradation conversion and thinning of pixel data on every predetermined group of pixels to create the grayscale image so that the optimum processing effect is acquired in reference image removal processing described below. For example, a binarization operation is performed on the handwriting area 28 to generate the mask data 34 in the reference image removal processing. Suppose the threshold value of the binarization is set to T ($0<T<255$). In such as case, the CPU 2 performs the gradation conversion so that the brightness value ranges between T+1 and 255 and the thinning of the pixel data at every P (>1) pixels so as to create the grayscale reference image.

At STEP S1203, the CPU 2 generates a template of the handwriting sheet 24. The exemplary template may be that shown in FIG. 2 or that having the handwriting area 28 and the grayscale reference image 27 disposed at a neighboring position in the substantially same size.

Depending on the type of template, at STEP S1204, the CPU 2 disposes the photograph data selected at STEP S1201 at a given area of the template generated at S1203 if necessary. For example, the CPU 2 overwrites data of a predetermined area of the template rendered in the image memory 13 at STEP S1203 with the photograph data selected at STEP S1201.

As described above, the present invention does not specify the timing of the selection of the photograph data. Thus, for example, if STEP S1201 is omitted, the processing for disposing the photograph data in the template may also be omitted from STEP S1204.

At STEP S1205, the CPU 2 prints the handwriting sheet 24.

When generating the reference image to be printed on the background, the CPU 2 performs both the thinning operation and the gradation conversion operation. However, only one of these operations may be used.

According to the above-described steps S1201 to S1205, an image combining apparatus 1 such as a multifunction printer (hereinafter, referred to as "MFP") prints the handwriting sheet 24 used by a user to instruct the combination of the handwritten characters/illustrations.

In addition, the present invention does not specify types of a user interface for giving a printing command. For example, in this exemplary embodiment, the handwriting sheet 24 is used as the user interface for giving the printing command. However, a key input operation on the MFP may also be used. Furthermore, the printing command is not necessarily issued in the MFP. For example, the print command may be issued from a digital camera connected via a universal serial bus (USB).

Moreover, the photograph to be combined and the reference image generated from the photograph may be printed in the handwriting sheet 24 and in the handwriting area 28, respectively. These printed images allow the user to easily guess the positional relationship of the combined result. Thus, the user can write the handwritten image while considering the positional relationship between the handwritten image and the selected photograph in the combined image.

As described above, according to the steps described in the flowchart shown in FIG. 19, the handwriting sheet 24 is printed.

Now, the process of analyzing the completed handwriting sheet 24 and of printing the combined image according to the analysis will be described next. The image combining apparatus 1 such as an MFP performs this process.

Figure 20:
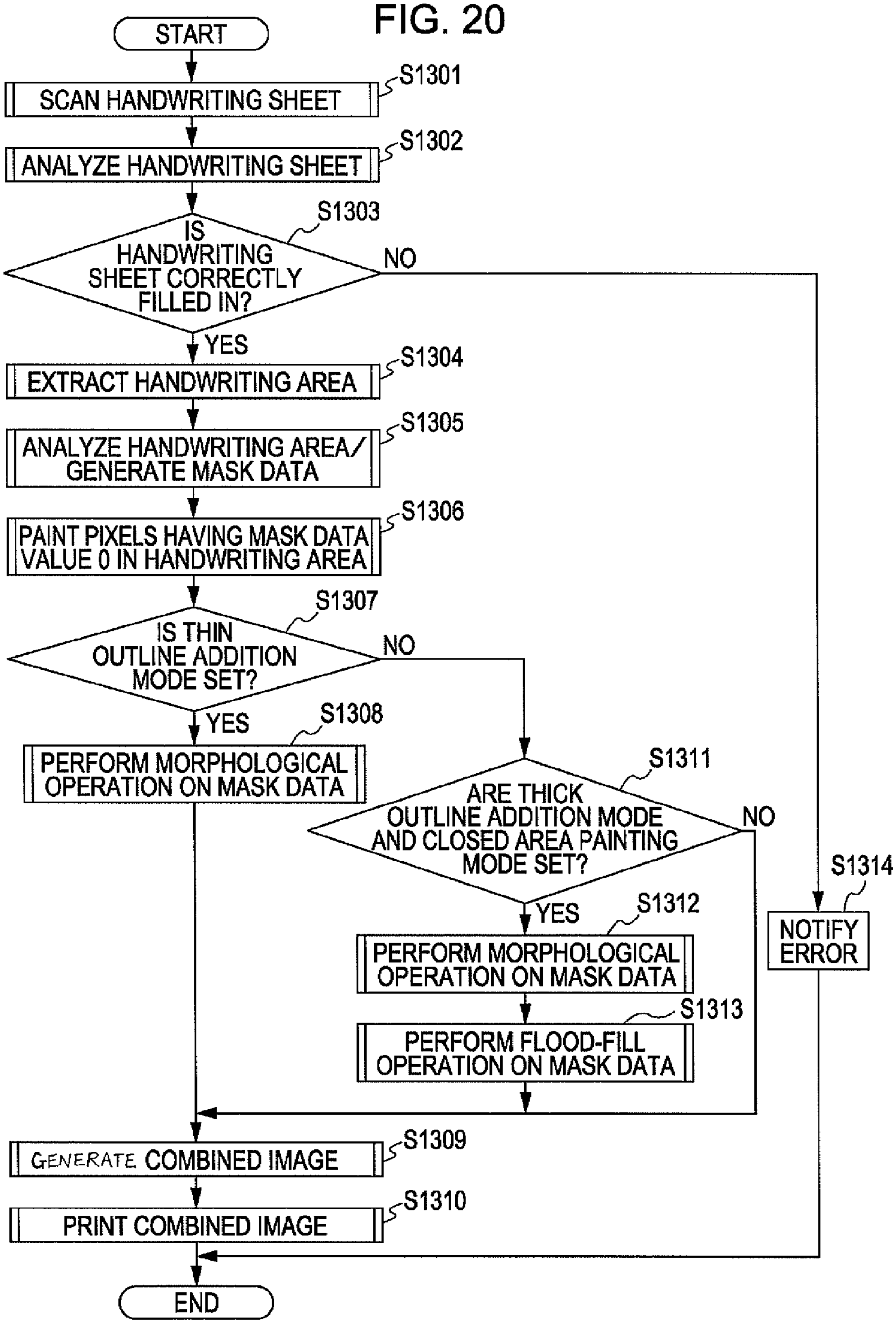
FIG. 20 is a flowchart showing a process of analyzing a handwriting sheet and printing a combined image.

FIG. 20 is a flowchart showing a series of steps of analyzing the handwriting sheet 24 and printing the combined image.

At STEP S1301, the MFP scans the handwriting sheet 24. The present invention does not specify the detail of the scanning operation of the handwriting sheet 24. However, for example, the handwriting sheet 24 may be scanned at resolutions sufficient for the analysis thereof and stored in a given scanned image memory as 8-bit RGB color data.

At STEP S1302, the MFP analyzes the handwriting sheet 24. The present invention does not specify a method of determining whether or not the scanned image is the handwriting sheet 24. However, for example, this determination of whether or not the scanned image is the handwriting sheet 24 may be made on the basis of whether or not feature points (i.e., feature pixels), which is specific to the handwriting sheet 24, are detected in the image stored in the image memory. In addition, the MFP also analyzes a setting area. The present invention does not specify a method of analyzing the setting area. However, for example, the exemplary embodiment 8 employs an answer sheet form for the setting area. Accordingly, marked frames are determined on the basis of the number of pixels detected to have color density at or exceeding a predetermined level located in a marking area that is specified by predetermined coordinates. If the analysis shows that the scanned image is not the handwriting sheet 24 or the handwriting sheet 24 is marked in a wrong manner at STEP S1303, the process proceeds to STEP S1314. At STEP S1314, the MFP notifies a user of an error, and process ends. If the MFP determines the handwriting sheet is marked in a correct manner at STEP S1303, the process proceeds to STEP S1304.

At STEP S1304, the MFP roughly extracts the handwriting area 28. As mentioned above, the analysis of the handwriting sheet 24 is performed utilizing the answer sheet form at STEP S1302. Based on the positions of the marked frames, the MFP roughly extracts the handwriting area so that four "+" marks (not shown) are completely included in the extracted area. At STEP S1305, the MFP re-extracts an effective handwriting area from the roughly extracted handwriting area, and analyzes the effective handwriting area to generate the mask data 34 of pixels included in the effective handwriting area.

The re-extraction of the effective handwriting area from the roughly extracted handwriting area at STEP S1305 may be performed in the following manner. The MFP first performs a binarization operation to detect all of the "+" marks. On the basis of the positions of the detected "+" marks, the MFP then extracts an area within a frame of the handwriting area as the effective writing area. Now, an explanation is given on the binary image used for the detection of the "+" marks. Since the reference image printed in the handwriting area is a thinned-out image, the reference image remains as solitary pixels in the binary image. On the other hand, the handwritten characters/illustrations remain as groups of consecutive pixels. By performing a solitary pixel filtering operation such as median filtering on the binary image, the reference image printed on the background is removed and the binary image of the handwritten image is obtained. The binary image acquired by the filtering operation is used as the mask data. In the binary image, the values 1 and 0 represent black and white pixels, respectively.

At STEP S1309, the MFP combines the handwritten image and the photograph referring to the mask data generated at STEP S1305 to create a combined image. More specifically, the MFP uses pixel data of the handwriting area in a position where the mask data is 1, and pixel data of the photograph in a position where the mask data is 0 to create the combined image.

As mentioned above, since the mask data is acquired by performing the solitary pixel filtering operation, effects of the reference image on the handwriting area are completely removed. However, the pixels of the handwritten image to be combined still have the effects of the reference image printed on the background. Thus, before generating the combined image at STEP S1309, the MFP paints all of the pixels determined not to be the handwritten image in white referring to the mask data at STEP S1306. Here, although white is specified as the color used for painting the pixels, another color may be used. For example, the color is configured to be changeable by providing a color selection item in the handwriting sheet 24 or performing an operation unit 15. By painting all of the pixels except for those of the handwritten image in white, the effects of the reference image on the pixels of the handwritten image can be removed. In addition, in the exemplary embodiment 8, a mode for adding thick outlines and painting closed area is selected. Thus, the process proceeds to STEP S1312. The MFP performs a dilation morphological operation on the mask data. Furthermore, the MFP performs a flood-fill operation to replace the pixels located within an area enclosed by black pixels with the black pixels. As a result, the combined image acquired at STEP S1309 has the outlines and closed areas painted in the color used at STEP S1306. At STEP S1310, the MFP prints the image combined at STEP S1309, and the process ends.

When a mode for adding thin outlines is selected on the handwriting sheet 24, the MFP performs a dilation morphological operation on the mask data at STEP S1308. Accordingly, the thin outline is added to the combined image.

When a simple combination mode is selected, the MFP generates the combined image referring to the mask data generated at STEP S1305 without performing any operation on the mask data, and prints the combined image.

The process described above allows the reference image of the selected photograph to be printed in the handwriting area as the background image using pigmented ink instead of using the light color (i.e., the dropout color) of dye ink. Accordingly, a clear printed image of the combined result can be acquired without limitations regarding the kinds of writing tool (e.g., pen) used to write the handwritten image and without being affected by the background reference image.

Exemplary Embodiment 9

Figure 21:
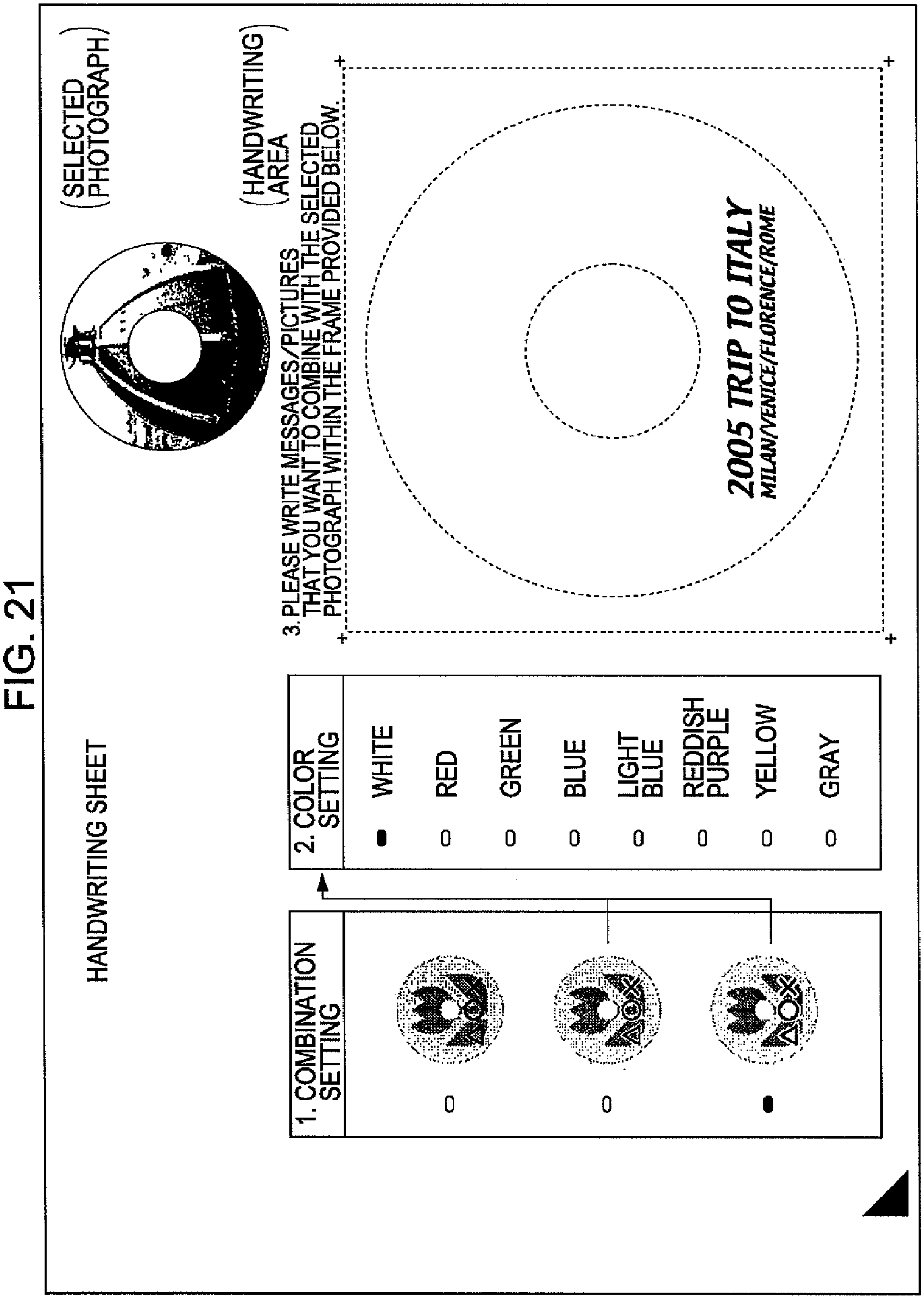
FIG. 21 shows an exemplary handwriting sheet used when a CD/DVD is used as a printing medium.

An exemplary embodiment 9 of the present invention describes a case where a combined image is printed on an optical disc such as a CD (Compact Disc) and a DVD (Digital Versatile Disc). The exemplary embodiment 9 employs the same process as that described in the exemplary embodiment 8. Thus, referring to FIG. 21, only advantages of the exemplary embodiment 9 will be described. FIG. 21 shows an example handwriting sheet used when a CD or a DVD (hereinafter, referred to as "handwriting sheet for CD/DVD") is used as a printing medium.

The handwriting sheet for CD/DVD includes setting items such as "special effect setting" for the combined image and "color setting". A color set in "color setting" is used, for example, drawing outlines added around the handwritten image and for painting closed areas. However, the functions set here are not limited to these two functions.

Figure 22:
FIG. 22 shows a printed image of a combined result when a CD/DVD is used as a printing medium.

The handwriting area of the handwriting sheet for CD/DVD includes a marker indicating the printing area of the CD/DVD printed on a background. The marker of the printing area of the CD/DVD is printed after pixel data thereof is thinned out. If a threshold of binarization performed in a process of analyzing the handwriting area is set to T (0<T<255), the marker image of the printing area of the CD/DVD shown here has a brightness value greater than T+1 (<255). The information printed on the handwriting sheet for CD/DVD allows a user to easily recognize a correct place to write the handwritten image so as to correctly print the handwritten image on the label of the CD/DVD. In addition, by performing the process described in the exemplary embodiment 8, the printed image of the combined result as shown in FIG. 22 can be acquired according to the settings set on the handwriting sheet. More specifically, on the handwriting sheet shown in FIG. 21, a mode for adding thick outlines around the handwritten image and a mode for painting closed areas in white are set. Thus, the printed image shown in FIG. 22 has thick outlines around the handwritten image and painted closed areas such as "00" of "2005".

Figure 23:
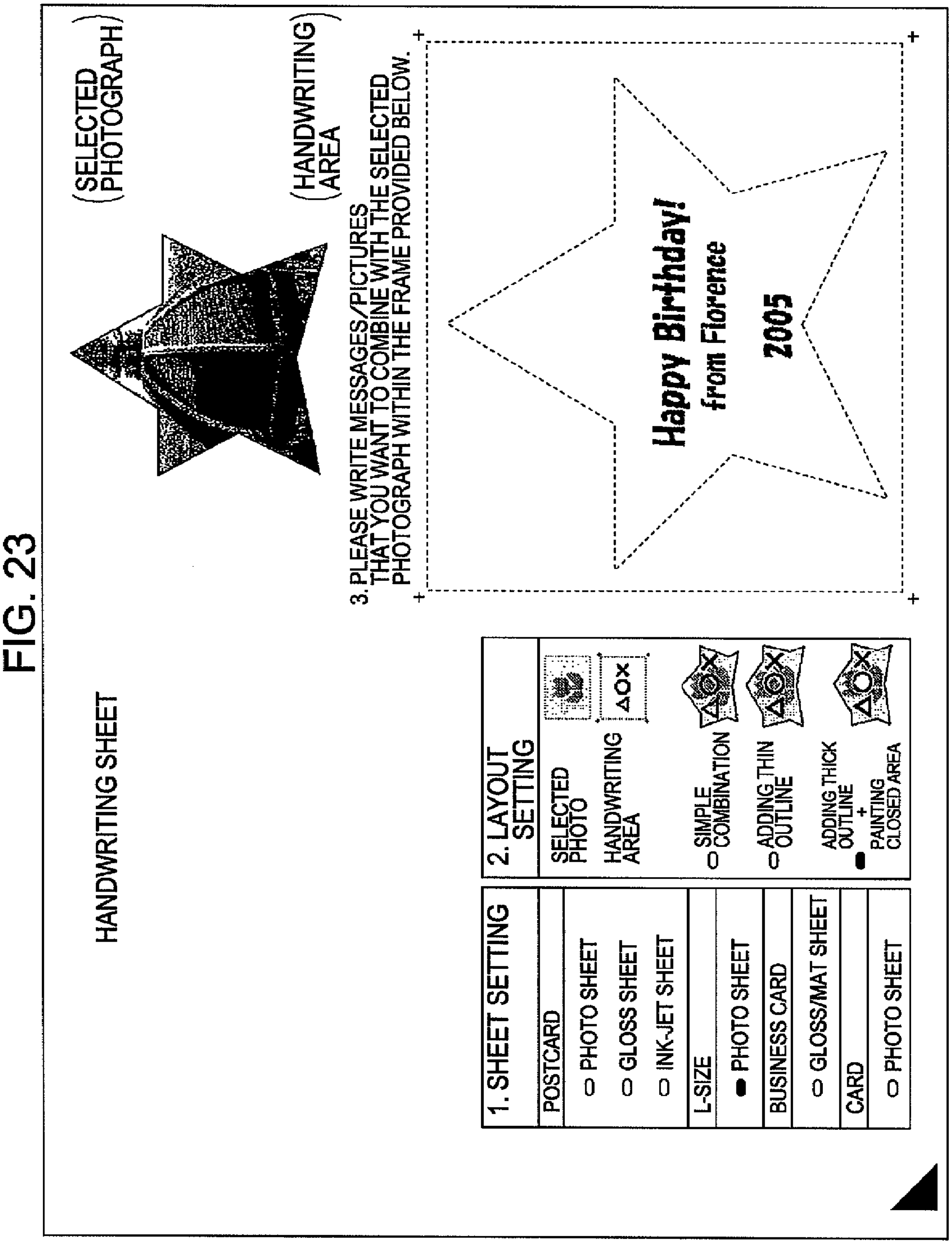
FIG. 23 shows an exemplary handwriting sheet used when generating a star-shaped card.
Figure 24:
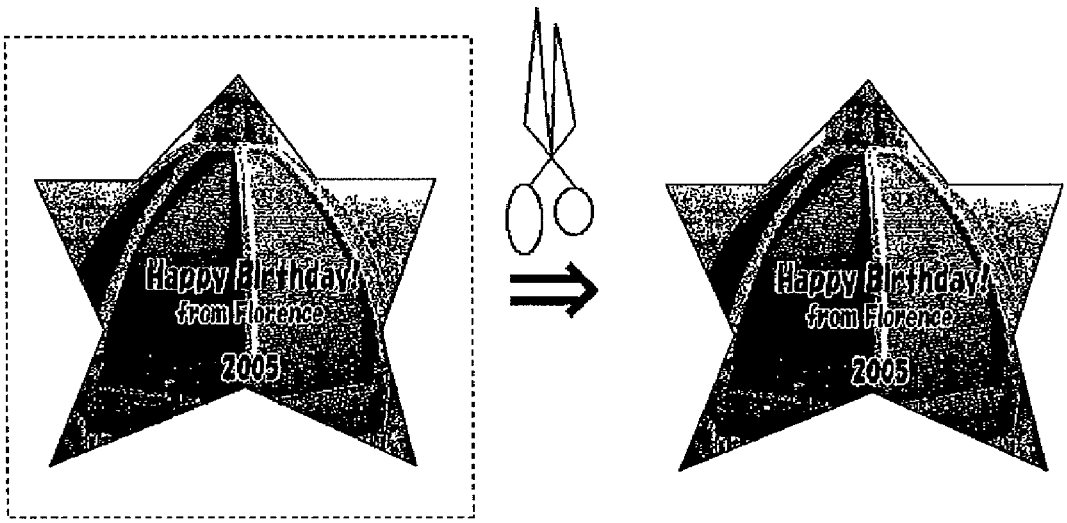
FIG. 24 shows an exemplary process of generating a star-shaped card.

The user uses a handwriting sheet for a star-shaped card (See, FIG. 23) to create a star-shaped card. After performing the above-described processing, the combined image is printed on a quadrilateral printing medium. By cutting the printed image with scissors or the like, the user can create the star-shaped card (See, FIG. 24).

As described above, the exemplary embodiment 9 enables the combined image to be clearly printed on an atypical printing medium without limitations regarding the kinds of writing tool (e.g., pen) used and without being affected by the background reference image.

A description will be given next on various types of handwriting sheets, allowing a user to confirm the positional relationship of the handwritten image and a reference image, used when the handwritten image and the reference image are combined.

Exemplary Embodiment 10

Figure 25:
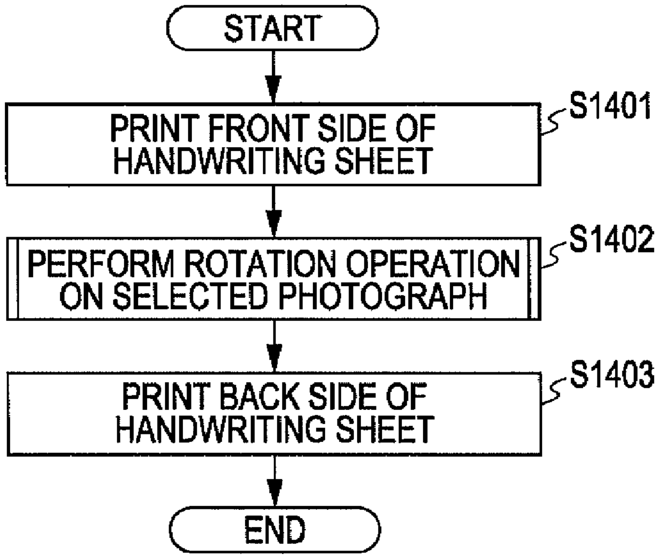
FIG. 25 is a flowchart showing a detailed process of printing a handwriting sheet according to an exemplary embodiment 10 of the present invention.

FIG. 25 is a flowchart showing a process of printing a reference image and a handwriting area on different sides of a handwriting sheet.

Figures 26A, 26B, 26C:
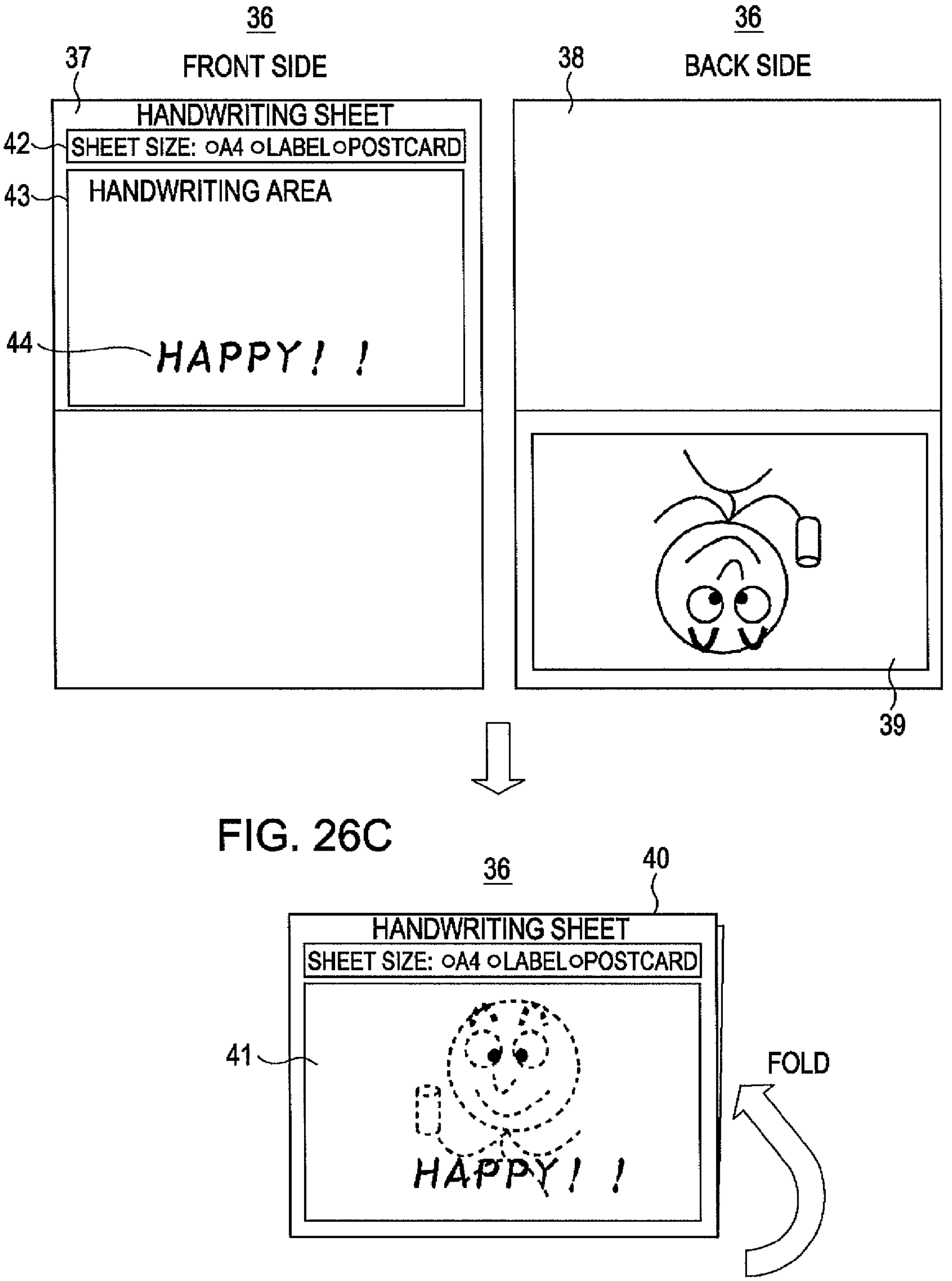
FIGS. 26A, 26B, and 26C show an exemplary handwriting sheet employed in an exemplary embodiment 10 of the present invention.

At STEP S1401, the front side of a handwriting sheet is printed. At STEP S1402, an image selected as the reference image is rotated. The rotation process will be described in detail below referring to FIG. 29. At STEP S1403, the reference image is printed on the back side of the handwriting sheet, and the process ends. FIGS. 26A, 26B, and 26C show components printed on the front/back sides.

FIGS. 26A, 26B, and 26C show a handwriting sheet 36 to be used in an exemplary embodiment 10.

Referring to FIG. 26A, the front side 37 of the handwriting sheet 36 has a setting area 42 and a handwriting area 43. A handwritten image 44, e.g., character and illustration, is also written on this side.

Referring to FIG. 26B, a reference image is printed on the back side 38 of the handwriting sheet 36. Here, an original photograph of the reference image is rotated by 180 degrees and printed as the reference image in a reference image area 39. A sample 40 is the handwriting sheet 36 folded at the center of the longer side. FIG. 26C illustrates a state in which the reference image printed on the back side 38 is seen through the sheet 36 from the front side 37, when the sheet 36 is folded.

Although the reference image, rotated by 180 degrees relative to the original image, is printed on the back side 38, the reference image seen from the front side of the folded sheet 36 is the same as the original image. Thus, a user can write the handwritten image 44 to be combined referring to the reference image seen through the sheet 36.

Figure 27:
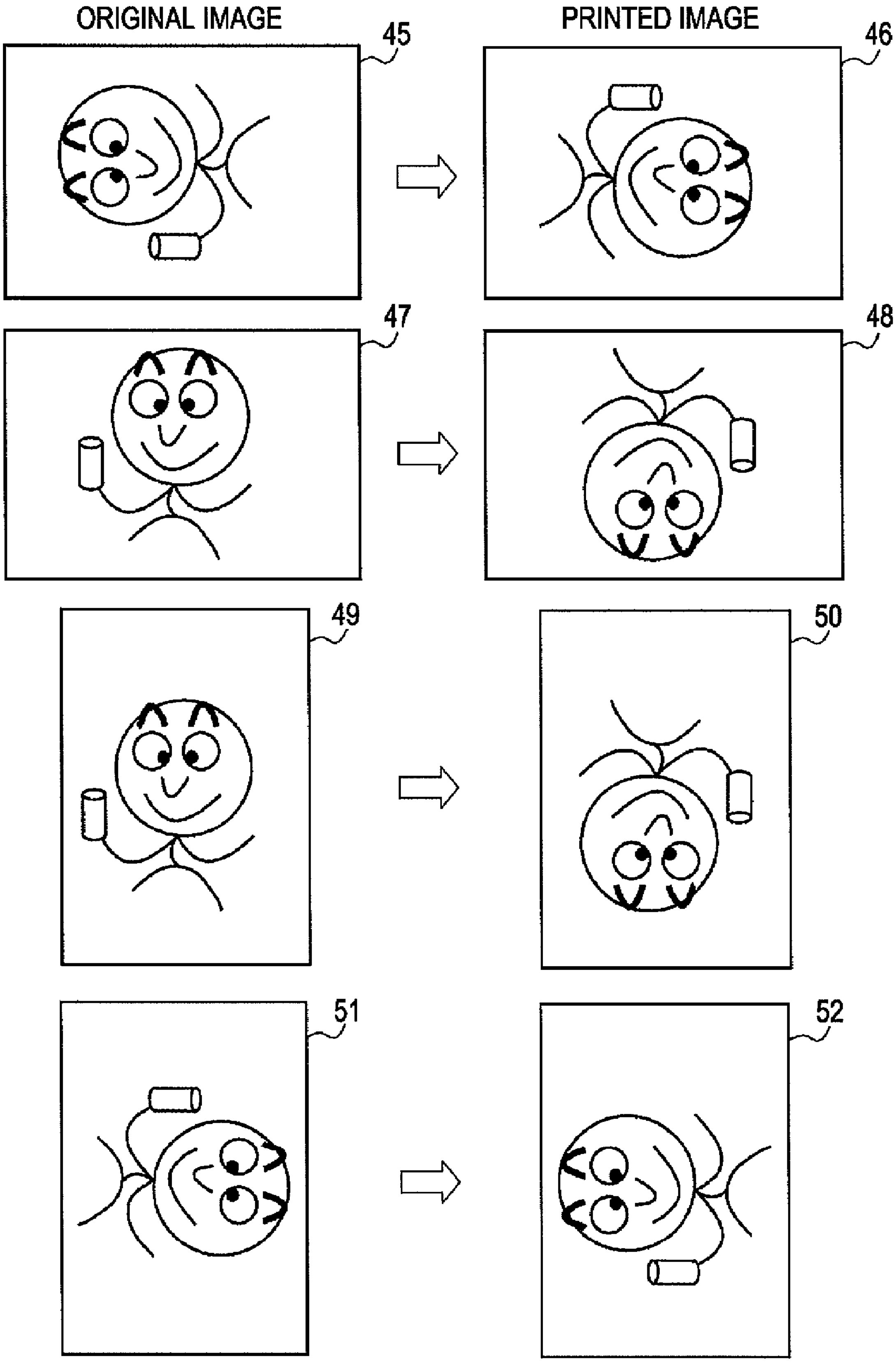
FIG. 27 shows a rotation operation of images performed when a handwriting sheet is printed in an exemplary embodiment 10 of the present invention.

FIG. 27 illustrates a rotation operation of images performed when the handwriting sheet is printed in the exemplary embodiment 10.

More specifically, in the exemplary embodiment 10, an image 46, obtained by rotating an original image 45, is printed on the handwriting sheet. Likewise, images 48, 50, and 52, obtained by rotating original images 47, 49, and 51, are printed, respectively.

Figure 28:
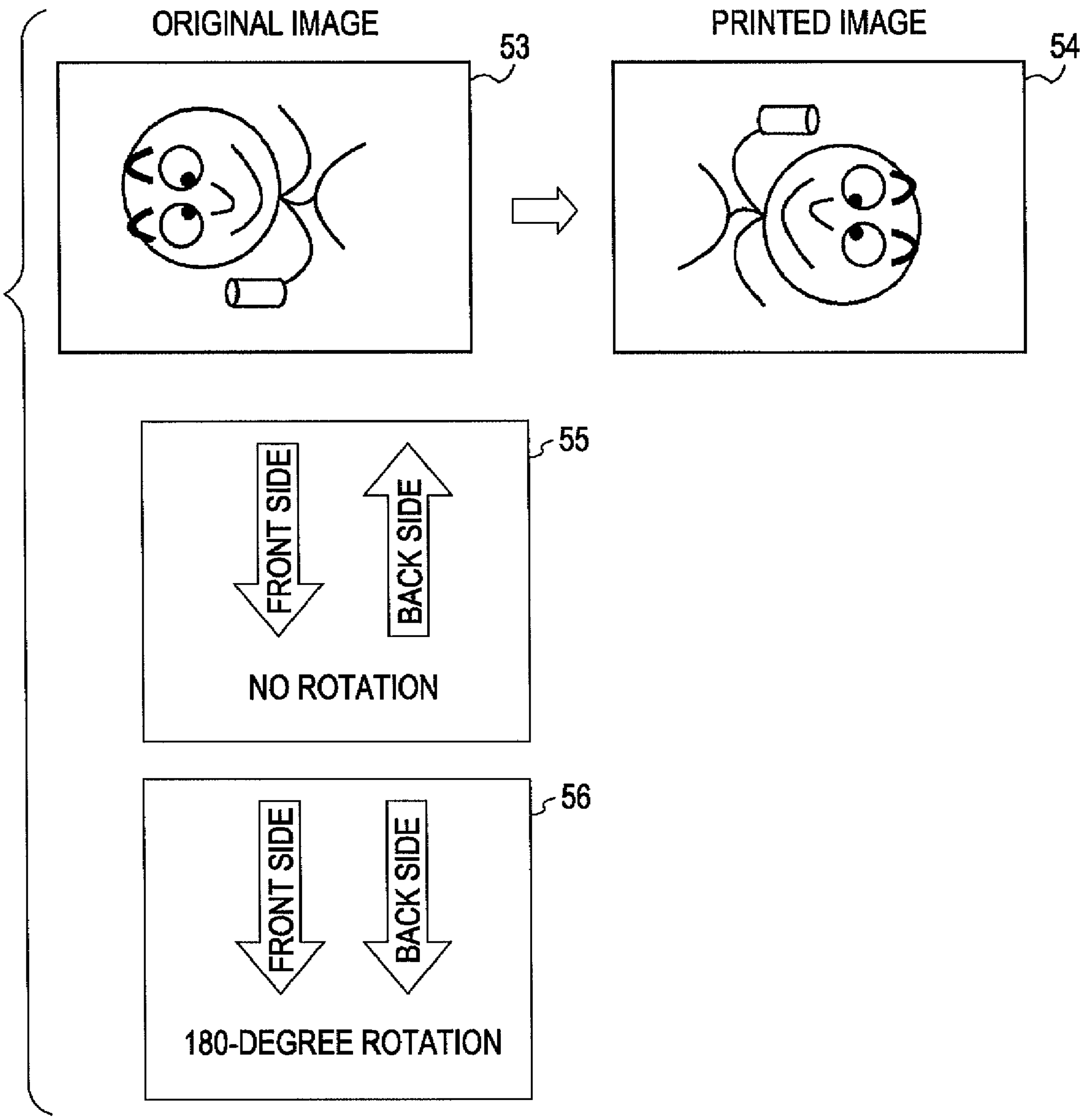
FIG. 28 shows conceptual diagrams regarding example methods of rotating an image to be printed on the back side of the handwriting sheet.

FIG. 28 shows conceptual diagrams of example methods regarding rotating an image to be printed on the back side of the handwriting sheet.

An image 53 is rotated and printed on the handwriting sheet as an image 54. Conceptual diagrams 55 and 56 illustrate the image rotation methods used when generating the handwriting sheet.

The conceptual diagram 55 shows a case where images are printed on the front side of the handwriting sheet shown in FIG. 26A from the top to the bottom (i.e., from the leading end to the trailing end), whereas the reference image is printed on the back side of the handwriting sheet from the bottom to the top (i.e., from the trailing end to the leading end). In this case, no rotation operation is required.

More specifically, as is clear from FIG. 27, the reference image rotated by 180 degrees relative to the original image is printed on the handwriting sheet. When the reference image is printed on the back side of the handwriting sheet from the bottom to the top, the reference image is printed on the back side while automatically being rotated by 180 degrees relative to the original image. Thus, the rotation operation is not required.

On the other hand, as shown in the conceptual diagram 56, when the reference image is printed on the back side of the handwriting sheet from the top to the bottom (i.e., from the leading end to the trailing end), the same image as the original image is printed on the back side if the rotation operation is not performed. Thus, the image has to be rotated by 180 degrees.

Figure 29:
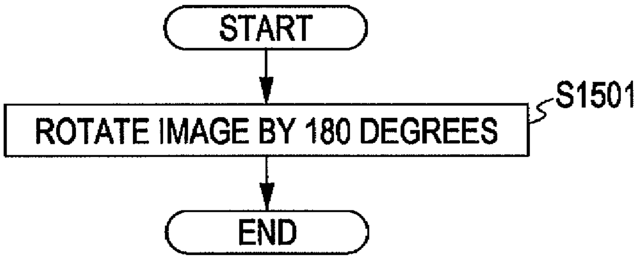
FIG. 29 is a flowchart showing a rotation process performed when printing a handwriting sheet according to an exemplary embodiment 10 of the present invention.

FIG. 29 is a flowchart showing a process of the rotation operation performed when the handwriting sheet is printed in the exemplary embodiment 10.

An image combining apparatus, such as a printing apparatus, according to the exemplary embodiment 10 prints both the front side and the back side of the handwriting sheet from the top to the bottom (i.e., from the leading end to the trailing end) as shown in the conceptual diagram 56, when performing the two-sided printing. Thus, as shown in FIG. 29, the image combining apparatus rotates the image when printing the handwriting sheet.

According to the exemplary embodiment 10, the reference image to be combined is printed on the back side of the handwriting sheet. When writing the handwritten image, the user can see the reference image through the sheet from the front side. Thus, the user can write the handwritten image while confirming the virtually combined image.

Exemplary Embodiment 11

In an exemplary embodiment 11 of the present invention, a handwriting sheet 57 is folded at a center of a shorter side when it is compared to that of the exemplary embodiment 10. More specifically, in the exemplary embodiment 11, the handwriting sheet 57 is folded longitudinally and a reference image printed on the back side 59 of the handwriting sheet 57 is seen through the sheet 57 from the front side 58.

Figure 30A:
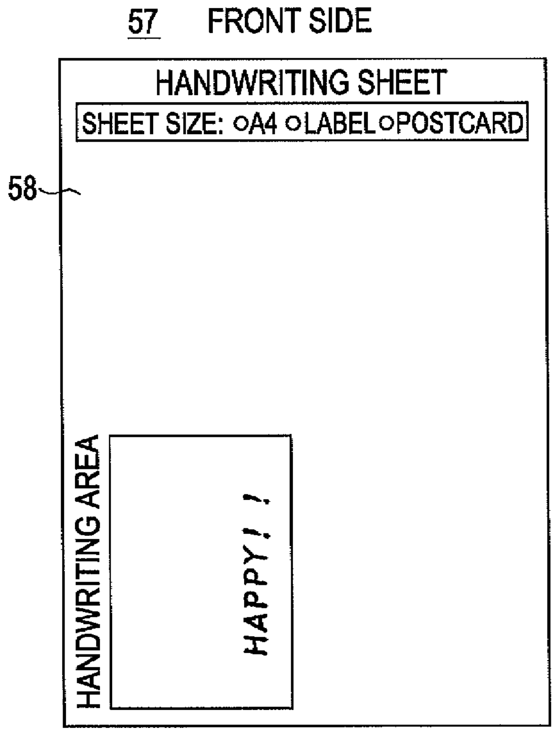
FIGS. 30A, 30B, and 30C show a handwriting sheet employed in an exemplary embodiment 11 of the present invention.
Figure 30B:
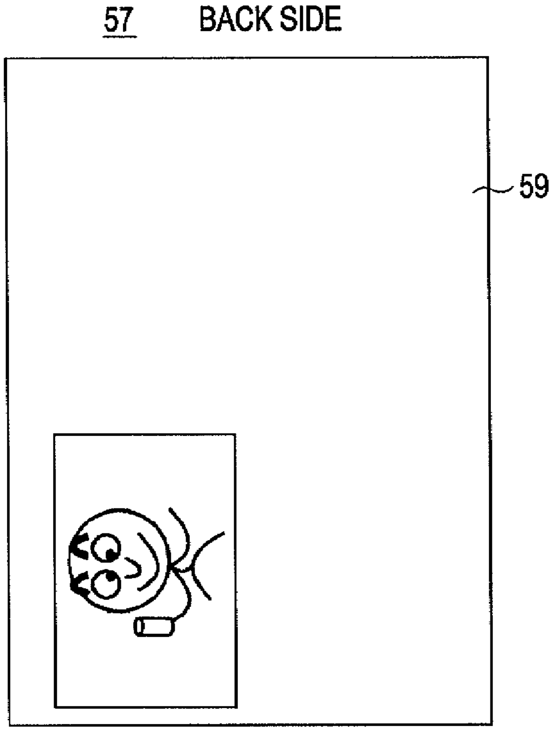
Figure 30C:
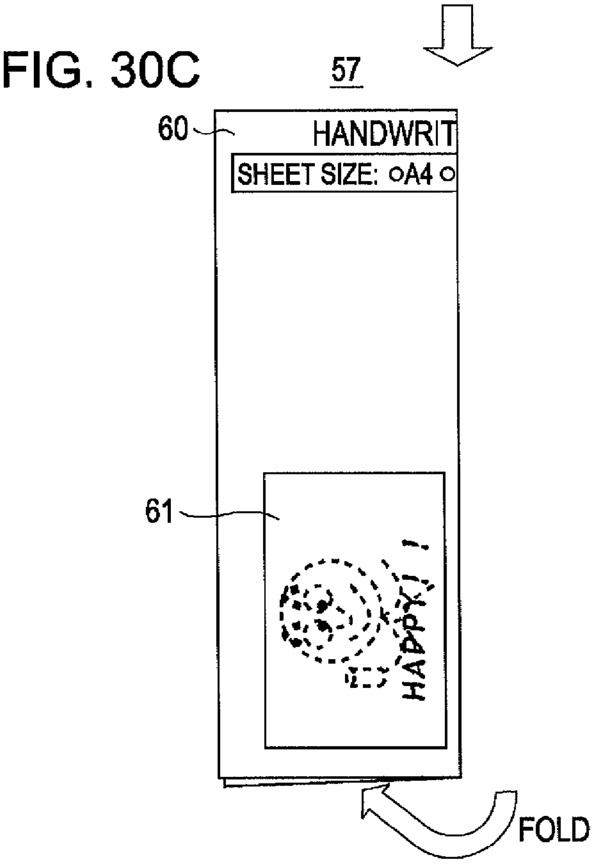

FIGS. 30A, 30B, and 30C show the handwriting sheet 57 according to the exemplary embodiment 11.

The handwriting sheet 57 of this exemplary embodiment differs from that of the exemplary embodiment 10 in that the sheet 57 is folded longitudinally. A sample 61 is the handwriting sheet 57 folded at the center of the shorter side. FIG. 30C illustrates a state in which the reference image printed on the back side 59 is seen through the sheet 57 from the front side 58, when the sheet 57 is folded. The reference image seen from the front side 58 of the folded sheet 57 is the same as the original image. Thus, a user can write the handwritten image to be combined referring to the reference image seen through the sheet 57.

Figure 31:
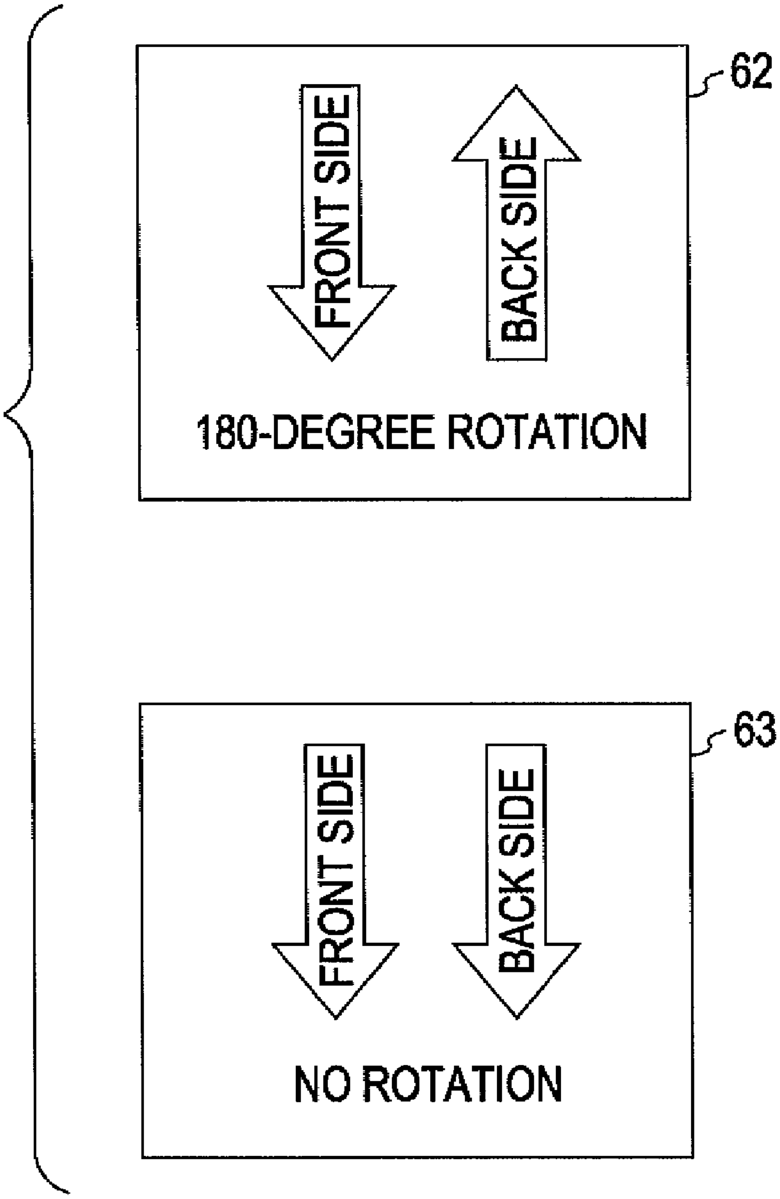
FIG. 31 shows conceptual diagrams regarding exemplary methods of rotating an image to be printed on the back side when a handwriting sheet is printed.

FIG. 31 shows conceptual diagrams of exemplary methods regarding rotating an image to be printed on the back side when the handwriting sheet 57 is printed.

The conceptual diagram 62 shows a case where an image is printed on the front side of the handwriting sheet 57 shown in FIG. 30A from the top to the bottom (i.e., from the leading end to the trailing end), whereas the reference image is printed on the back side from the bottom to the top (i.e., from the trailing end to the leading end) of the sheet 57. In this case, the image, rotated by 180 degrees relative to the original image, is printed on the back side of the handwriting sheet 57, when no rotation operations are performed. However, in this exemplary embodiment, the image printed on the back side has to be same as the original image. Thus, the image is rotated by 180 degrees when printed on the back side of the handwriting sheet 57 from the bottom to the top (i.e., from the trailing end to the leading end). On the other hand, as shown in the conceptual diagram 63, when the reference image is printed on the back side of the handwriting sheet 57 from the top to the bottom (i.e., from the leading end to the trailing end), no rotation operation is required.

An image combining apparatus, such as a printing apparatus, according to the exemplary embodiment 11 prints both the front side and the back side of the handwriting sheet from the top to the bottom, when performing the two-sided printing. Thus, as shown in conceptual diagram 63, the image combining apparatus prints the reference image on the back side without performing the rotation operation when printing the handwriting sheet.

According to the exemplary embodiment 11, the reference image to be combined is printed on the back side of the handwriting sheet. When writing the handwritten image, the user can see the reference image through the sheet from the front side. Thus, the user can write the handwritten image while confirming the virtually combined image.

According to the exemplary embodiments 10 and 11, the handwriting sheet having improved usability, allowing the user to see the image printed on the back side by folding the sheet and to write the handwritten image in a handwriting area while confirming the virtually combined image, can be printed.

Exemplary Embodiment 12

In an exemplary embodiment 12, an image printed on the back side of a handwriting sheet described in the exemplary embodiment 10 is seen through the sheet from the front side.

Figure 32A:
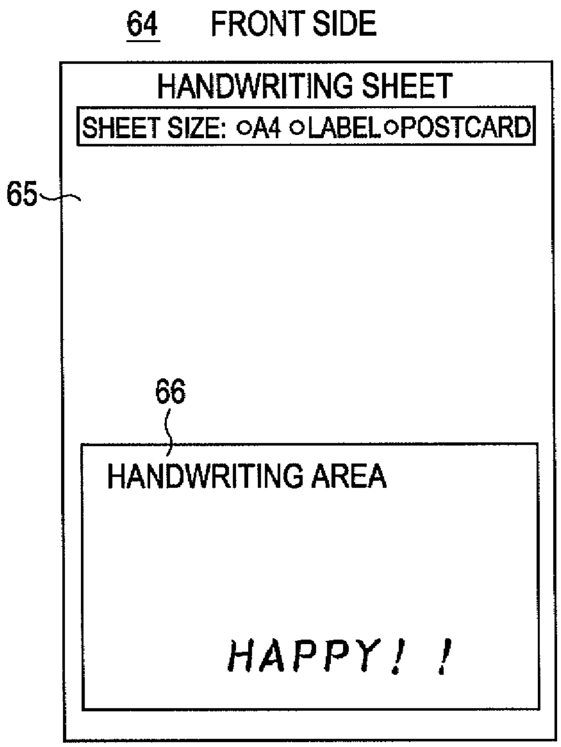
FIGS. 32A, 32B, and 32C show a handwriting sheet employed in an exemplary embodiment 12 of the present invention.
Figure 32B:
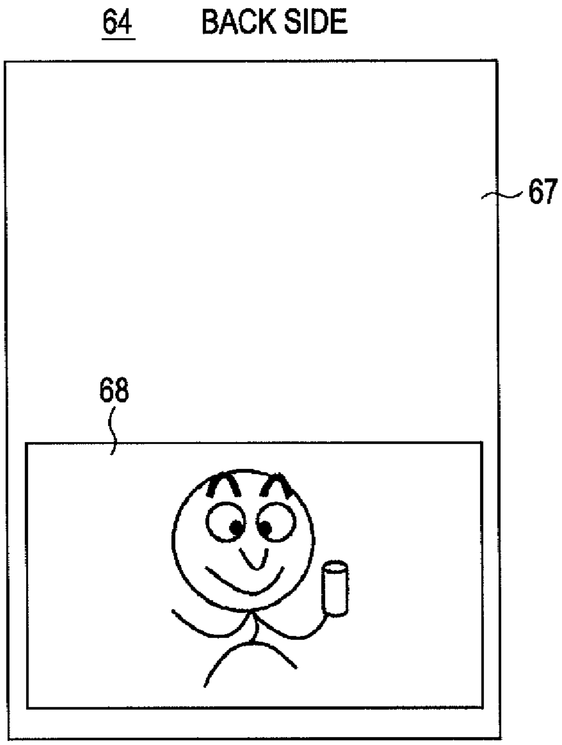
Figure 32C:
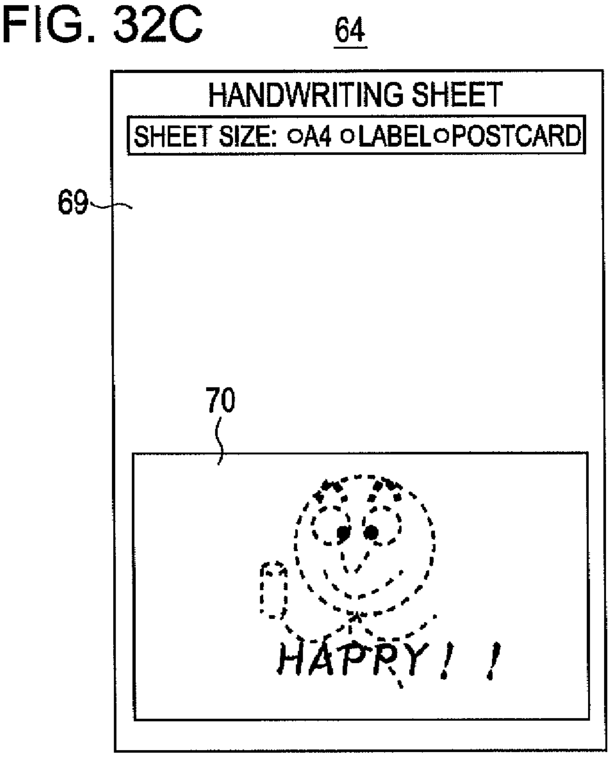

FIGS. 32A, 32B, and 32C show a handwriting sheet 64 of the exemplary embodiment 12 of the present invention.

FIG. 32C illustrates a state in which a reference image 68 printed on the back side 67 is seen through the sheet 64 from the front side 65. The reference image 68 seen from the front side 65 is the same as the original image. Thus, a user can write the handwritten image to be combined referring to the image seen through the sheet 64.

Figure 33:
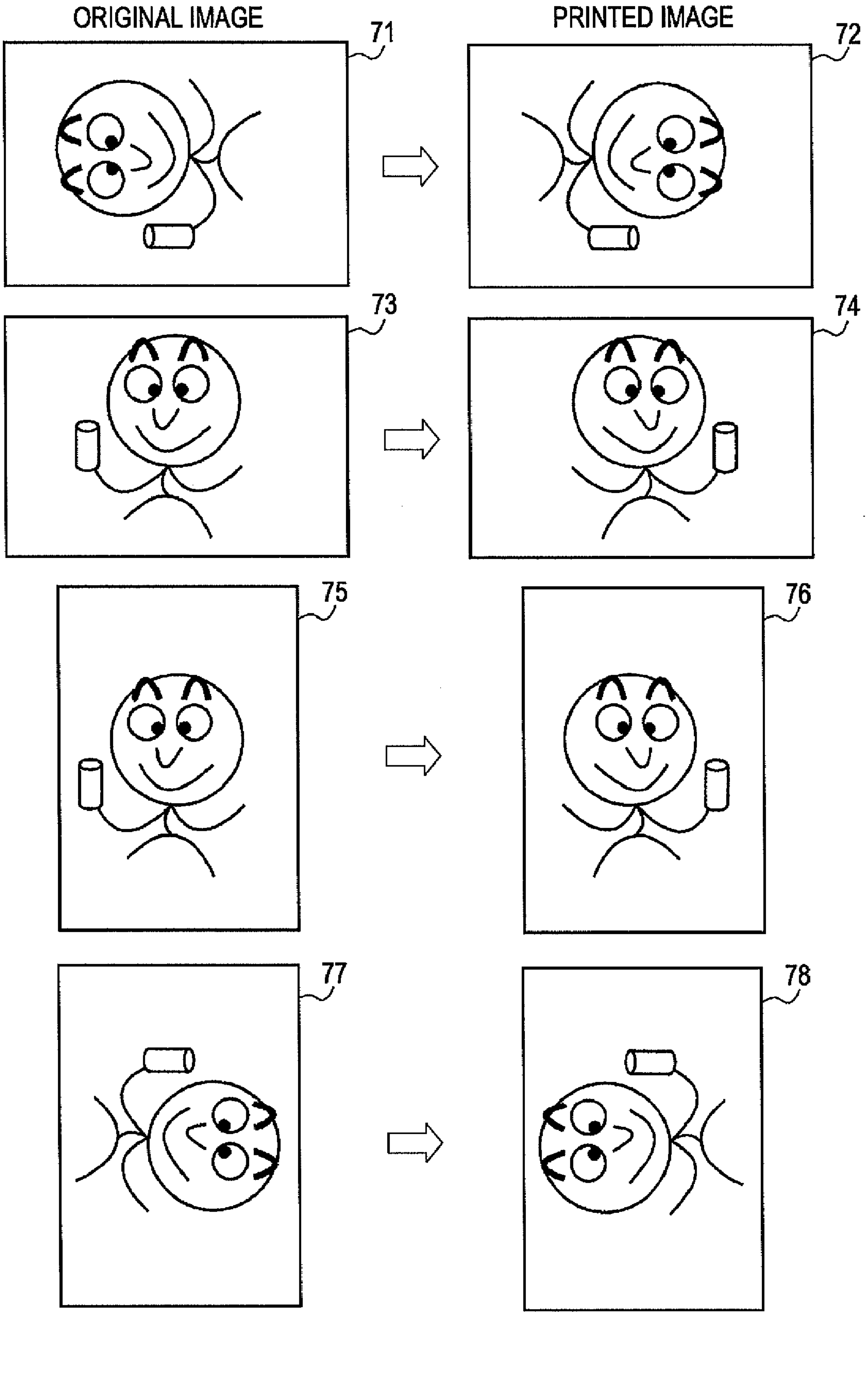
FIG. 33 shows a rotation operation of an image performed when a handwriting sheet is printed in an exemplary embodiment 12 of the present invention.

FIG. 33 illustrates a rotation operation of images performed when the handwriting sheet is printed in the exemplary embodiment 12.

More specifically, in the exemplary embodiment 12, an image 71 is rotated so as to be an image 72 and printed on the handwriting sheet. Likewise, images 73, 75, and 77 are rotated so as to be images 74, 76, and 78, respectively, and printed.

Figure 34:
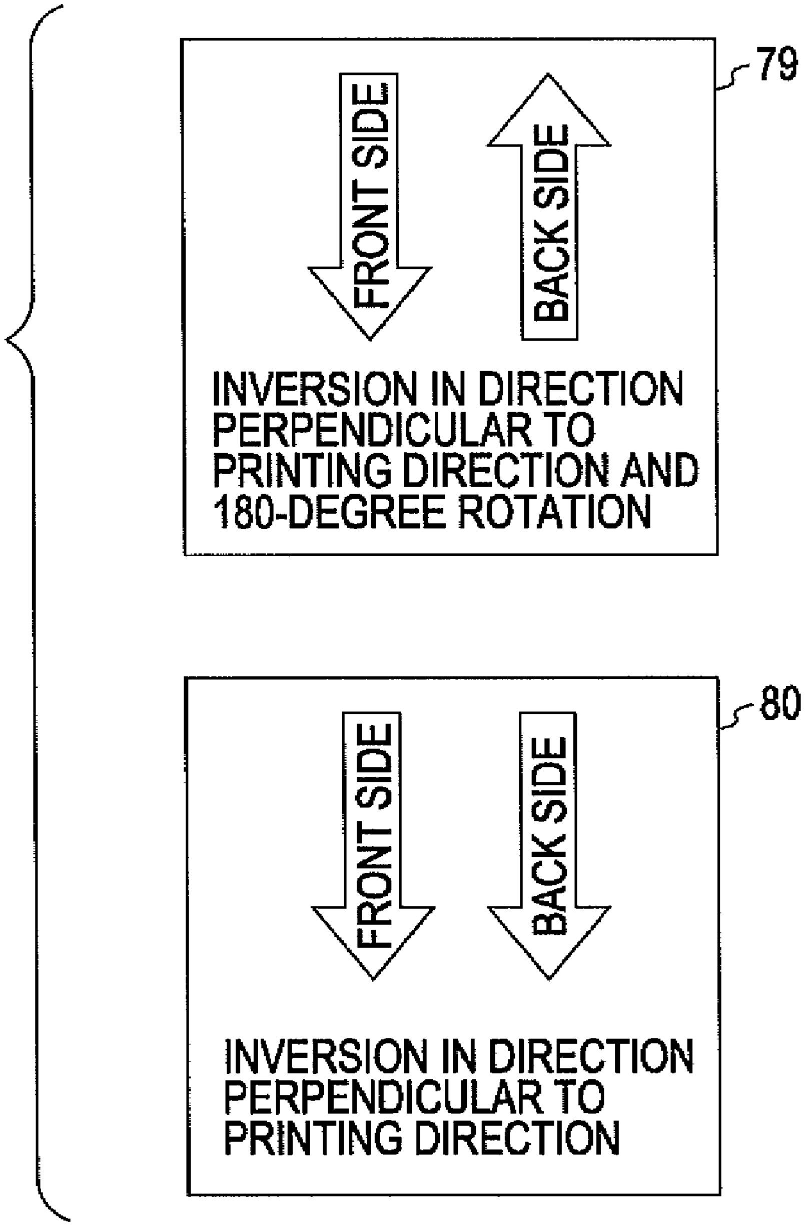
FIG. 34 shows conceptual diagrams regarding exemplary methods of rotating an image to be printed on the back side of a handwriting sheet when the handwriting sheet is printed.

FIG. 34 shows conceptual diagrams regarding exemplary methods of rotating an image to be printed on the back side of the handwriting sheet when the handwriting sheet is printed.

The conceptual diagram 79 shows a case where the image is printed on the front side of the handwriting sheet 64 from the top to the bottom (i.e., from the leading end to the trailing end of the handwriting sheet), whereas the image is printed on the back side from the bottom to the top (i.e., from the trailing end to the leading end of the handwriting sheet).

In this case, relative to the original image, the image printed on the handwriting sheet is rotated by 180 degrees if no rotation and inverting operations are performed. Accordingly, when the image is printed on the back side of the handwriting sheet from the bottom to the top (i.e., from the leading end to the trailing end), the image to be printed is inverted in a direction perpendicular to the printing direction and rotated by 180 degrees. On the other hand, as shown in the conceptual diagram 80, when the image is printed on the back side of the handwriting sheet from the top to the bottom (i.e., from the leading end to the trailing end), the printed image is inverted relative to the reference image. Accordingly, the image is inverted in the direction perpendicular to the printing direction but not rotated.

An image combining apparatus, such as a printing apparatus, according to the exemplary embodiment 12 prints both the front side and the back side of the handwriting sheet from the top to the bottom (i.e., the leading end to the trailing end) when performing the two-sided printing as shown in conceptual diagram 80. Thus, the image combining apparatus performs the inverting operation but does not perform the rotation operation, when printing the handwriting sheet, as shown in conceptual diagram 80.

Figure 35:
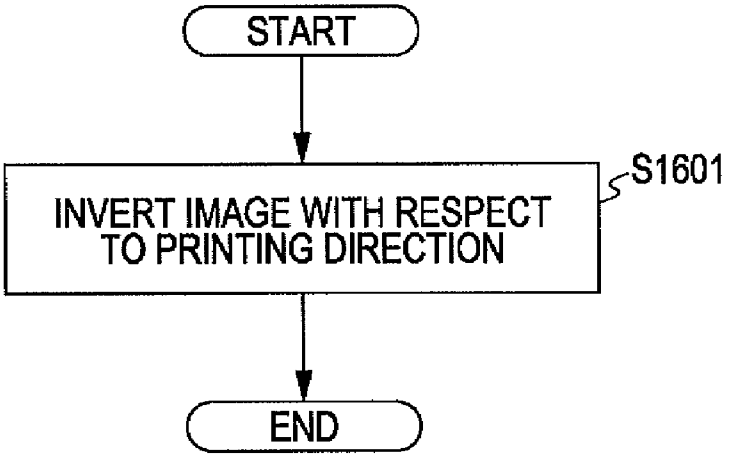
FIG. 35 is a flowchart showing a process of inverting an image with respect to a printing direction according to the exemplary embodiment 12 of the present invention.

FIG. 35 is a flowchart showing a process of inverting the image with respect to the printing direction according to the exemplary embodiment 12.

More specifically, FIG. 35 corresponds to the conceptual diagram 80 of FIG. 34 and shows a process invoked by STEP S1402 shown in FIG. 25. At STEP S1601, the image is inverted with respect to the printing direction.

Figure 36:
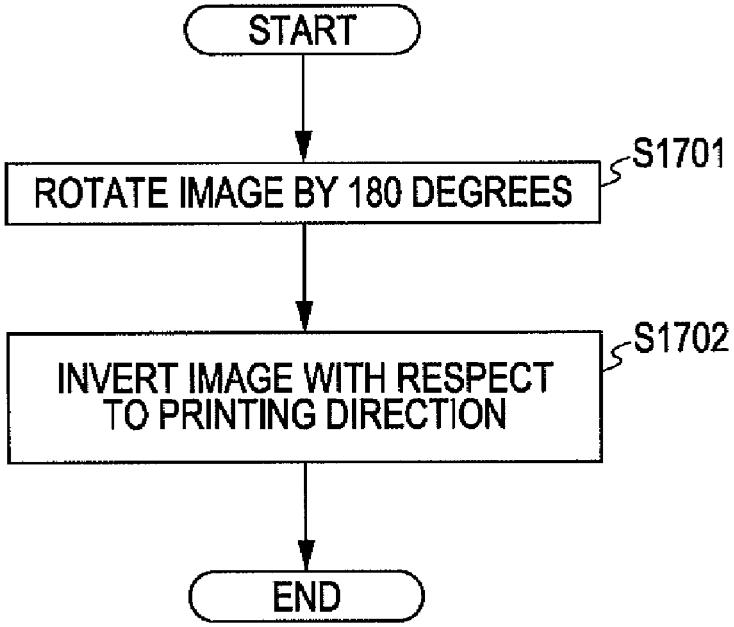
FIG. 36 is a flowchart showing a process of inverting an image with respect to a printing direction and rotating the image by 180 degrees according to an exemplary embodiment 12 of the present invention.

FIG. 36 is a flowchart showing a process of inverting the image with respect to the printing direction and rotating the image by 180 degrees according to the exemplary embodiment 12.

More specifically, FIG. 36 corresponds to the conceptual diagram 79 of FIG. 34 and shows a process invoked by STEP S1402 shown in FIG. 25.

At STEP S1701, the image is rotated by 180 degrees. At STEP S1702, the image is inverted with respect to the printing direction.

According to the exemplary embodiment 12, the reference image to be combined is printed on the back side of the handwriting sheet. When writing the handwritten image, the user can see the reference image through the sheet. Thus, the user can write the handwritten image while confirming the virtually combined image.

The above described exemplary embodiments of the present invention may be implemented by programs.

The exemplary embodiments 10 to 12 can advantageously implement a virtually combined image instead of printing the reference image in a handwriting area of a handwriting sheet, when printing a combined image after superimposing image data scanned from the handwriting sheet on photograph data recording on a recording medium such as a memory card inserted in an image combining apparatus.

In addition, the exemplary embodiments 1 to 5 combine the handwritten image written in the handwriting area 28 and the photograph 30. However, further image processing may be preformed on the handwritten image written in the handwriting area 28. For example, a trimming operation may be performed on an area of the photograph 30 enclosed by the handwritten image (i.e., a trimming frame).

Furthermore, the exemplary embodiments 1 to 5 and 7 cause a printer unit 12 to print the combined result of the photograph 30 and the handwritten image 29. However, the combined result may be displayed on a display unit 14 of an operation panel 16. This configuration also provides similar advantages. Additionally, the combined result may be recorded on a recording medium 18 such as a memory card. The image data of the combined result may also be transferred to another device via a communication line 23 or an interface 20. This also provides similar advantages.

The above-described embodiments can advantageously allow a user to write a handwritten image on a sheet while confirming the positional relationship between a photograph and the handwritten image to be combined.

In addition, the above-described embodiments can advantageously reduce effects of a reference image on a handwritten image without losing recognizability of the positional relationship between the reference image and the handwritten image by generating the reference image after performing image correction in accordance with characteristics of a photograph to be combined.

Additionally, the above-described embodiments can advantageously remove a reference image printed on a background without using a dropout color.

Furthermore, the above-described embodiments can advantageously reduce limitations regarding the kinds of printing medium to be used as a handwriting sheet.

Moreover, the above-described embodiments can advantageously allow a user to easily adjust a position of a handwritten image to fit in a shape of a printing medium by printing a marker indicating the shape of the printing medium on a background.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application Nos. 2005-286294 and 2005-289037 both filed on Sep. 30, 2005 and Japanese Application No. 2006-202617 filed on Jul. 25, 2006 which are hereby incorporated by reference herein in their entirety.

What is claimed is:

1. An image combining apparatus for printing a writing sheet having a handwriting area in which a user writes a handwritten image to be combined with a photograph, the image combining apparatus comprising:

a generating unit configured to generate a reference image from the photograph; and a printing unit configured to print the reference image generated by the generating unit in the handwriting area, wherein the generating unit analyzes color density of the reference image, and performs a negative-positive reversing operation on the reference image only when the reference image is determined to have a negative tendency so that color density characteristics of the reference image always show a positive tendency.

2. The apparatus according to claim 1, further comprising:

an extracting unit configured to extract, after clipping image data of the handwriting area from image data acquired by scanning the writing sheet having the handwritten image written over the reference image, only the handwritten image from the clipped image data; and a combining unit configured to combine the handwritten image extracted by the extracting unit and the photograph.

3. The apparatus according to claim 1, wherein the generating unit generates the reference image with color density of the reference image being decreased so that a maximum color density of the reference image is set at or lower than a predetermined level.

4. The apparatus according to claim 2, wherein the extracting unit extracts a part having color density exceeding a predetermined level as the handwritten image from the clipped image data.

5. A control method for an image combining apparatus for printing a writing sheet having a handwriting area in which a user writes a handwritten image to be combined with a photograph, the control method comprising:

generating a reference image from the photograph; and printing the reference image generated in the step of generating the reference image in the handwriting area, wherein the step of generating the reference image includes analyzing color density of the reference image, and performing a negative-positive reversing operation on the reference image only when the reference image is determined to have a negative tendency so that color density characteristics of the reference image always show a positive tendency.

6. The method according to claim 5, further comprising:

clipping image data of the handwriting area from image data acquired by scanning the writing sheet having the handwritten image written over the reference image, then extracting only the handwritten image from the clipped image data; and combining the handwritten image extracted in the step of extracting the handwritten image and the photograph.

7. The method according to claim 5, wherein the step of generating the reference image includes generating the reference image with color density of the reference image being decreased so that a maximum color density of the reference image is set at or lower than a predetermined level.

8. The method according to claim 6, wherein the step of extracting the handwritten image includes extracting a part having color density exceeding a predetermined level from the clipped image data as the handwritten image.

* * * * *